US012656577B2

(12) United States Patent
Dong et al.

(10) Patent No.: US 12,656,577 B2
(45) Date of Patent: Jun. 16, 2026

(54) OPTICAL IMAGING LENS

(71) Applicant: Genius Electronic Optical (Xiamen) Co., Ltd., Xiamen (CN)

(72) Inventors: Chuanbo Dong, Xiamen (CN); Songchao Huang, Xiamen (CN); Ching-Han Yang, Xiamen (CN); Hung-Chien Hsieh, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 815 days.

(21) Appl. No.: 17/932,095

(22) Filed: Sep. 14, 2022

(65) Prior Publication Data

US 2023/0418027 A1 Dec. 28, 2023

(30) Foreign Application Priority Data

Jun. 22, 2022 (CN) .......................... 202210709577.4

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC ........ G02B 9/62; G02B 9/64; G02B 13/0045; G02B 13/16; G02B 13/0015; G02B 13/18; G02B 27/0025; G02B 27/0012; G02B 27/0172; G02B 15/146; H04N 5/222; H04N 5/2254
USPC ......... 359/656–658, 708, 713, 749, 756–762
See application file for complete search history.

(56) References Cited

U.S. PATENT DOCUMENTS

| | | | |
|---|---|---|---|
| 2018/0074297 A1* | 3/2018 | Lee .................... | G02B 13/0045 |
| 2018/0329177 A1* | 11/2018 | Chen .................... | G02B 13/002 |
| 2020/0026036 A1* | 1/2020 | Teraoka ................. | G02B 13/04 |

* cited by examiner

*Primary Examiner* — Travis S Fissel
(74) *Attorney, Agent, or Firm* — Chen Yoshimura LLP

(57) ABSTRACT

An optical imaging lens may include a first lens element, a second lens element, a third lens element, a fourth lens element, a fifth lens element and a sixth lens element positioned in an order from an object side to an image side. Through designing concave and/or convex surfaces of the lens elements and an inequality, the optical imaging lens may increase field of view, shrink volume and provide well image quality.

19 Claims, 38 Drawing Sheets

Longitudinal
spherical aber.
field
1.000

-0.08    -0.03    0
(mm)

Field curvature
(sagittal direction)
image height (mm)
1.178

-0.08    0    0.02
(mm)

| 500 nm | 800 nm |
| 600 nm | 900 nm |
| 700 nm | 1000 nm |

Field curvature
(Tangential direction)
image height (mm)
1.178

-0.08    0    0.18
(mm)

Distortion
image height (mm)
1.178

0    70
(%)

| Embodiment 1 | | | | | | | |
| --- | --- | --- | --- | --- | --- | --- | --- |
| EFF = 1.112 mm ; HFOV = 33.300 degrees ; TTL = 4.484 mm | | | | | | | |
| Fno = 2.000 ; Image Height = 1.178 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| L1A1 | 1st lens element | 1.558 | 0.361 | 1.545 | 55.987 | -2.211 | Plastic |
| L1A2 | | 0.623 | 0.443 | | | | |
| L2A1 | 2nd lens element | -30.549 | 0.367 | 1.642 | 22.409 | 4.767 | Plastic |
| L2A2 | | -2.789 | 0.101 | | | | |
| STO | Aperture stop | INFINITY | 0.051 | | | | |
| L3A1 | 3rd lens element | 2.417 | 0.614 | 1.545 | 55.987 | 1.599 | Plastic |
| L3A2 | | -1.236 | 0.008 | | | | |
| L4A1 | 4th lens element | 1.975 | 0.243 | 1.642 | 22.409 | -2.283 | Plastic |
| L4A2 | | 0.800 | 0.087 | | | | |
| L5A1 | 5th lens element | 2.315 | 0.868 | 1.693 | 52.931 | 0.882 | Glass |
| L5A2 | | -0.702 | 0.062 | | | | |
| L6A1 | 6th lens element | -0.559 | 0.262 | 1.642 | 22.409 | -3.137 | Plastic |
| L6A2 | | -0.915 | 0.084 | | | | |
| TF1A1 | 1st Filtering unit | INFINITY | 0.210 | 1.517 | 64.167 | | |
| TF1A2 | | INFINITY | 0.131 | | | | |
| TF2A1 | 2nd Filtering unit | INFINITY | 0.400 | 1.517 | 64.167 | | |
| TF2A2 | | INFINITY | 0.193 | | | | |
| IMA | Image plane | INFINITY | | | | | |

FIG. 8

| Embodiment 1 | | | | |
|---|---|---|---|---|
| Aspherical Parameters | | | | |
| Surface# | K | a4 | a6 | a8 | a10 |
| L1A1 | -6.037944E-01 | 1.913680E-01 | -2.445389E-01 | 1.261822E-01 | -1.029887E-01 |
| L1A2 | -1.818216E-01 | 1.001257E-01 | 1.715058E+00 | -1.424379E+01 | 4.139922E+01 |
| L2A1 | 5.499926E+01 | 2.735518E-01 | 2.422251E-01 | 4.022874E+00 | -2.271131E+01 |
| L2A2 | -1.833047E+01 | 7.849681E-01 | -1.175373E+01 | 1.905018E+02 | -1.494345E+03 |
| L3A1 | 1.684111E+01 | 4.843685E-01 | -8.735353E+00 | 1.034405E+02 | -7.147362E+02 |
| L3A2 | -1.050206E-01 | -2.539860E-01 | 6.915387E-01 | -9.794867E+00 | 6.236571E+01 |
| L4A1 | -2.007310E+01 | -6.706607E-01 | -1.166984E+00 | 7.522295E+00 | -2.305859E+01 |
| L4A2 | -6.258020E-02 | -1.412514E+00 | 3.385810E-01 | 5.494943E+00 | -2.066811E+01 |
| L5A1 | -2.921884E+01 | 1.142854E-01 | -4.638632E-01 | 4.391892E+00 | -8.484960E+00 |
| L5A2 | -2.586610E-01 | 5.519376E-01 | -4.102353E-02 | 4.702651E+00 | -1.939140E+01 |
| L6A1 | -4.257744E+00 | -4.973362E-01 | 3.280396E+00 | -9.463263E+00 | 9.180764E+00 |
| L6A2 | -1.611945E+01 | 6.170297E-01 | 2.745544E-01 | -1.530675E+00 | 1.628216E+00 |
| Surface# | a12 | a14 | a16 | a18 | a20 |
| L1A1 | -1.778943E-02 | -1.944732E-02 | 8.858660E-02 | 1.711622E-02 | 4.248476E-02 |
| L1A2 | -3.042548E+01 | -1.504892E+02 | 1.951070E+02 | -3.109011E+01 | -5.317195E+01 |
| L2A1 | 5.618410E+01 | -1.413979E+02 | 1.625596E+02 | -6.898015E+01 | -7.271145E+02 |
| L2A2 | 5.561475E+03 | -7.070459E+03 | -4.759484E+03 | -2.934494E+03 | 8.947808E+03 |
| L3A1 | 2.479771E+03 | -3.581254E+03 | 1.411176E+02 | -1.843996E+02 | -8.363017E+02 |
| L3A2 | -2.034954E+02 | 2.076920E+02 | 1.414690E+01 | -2.478189E+00 | -4.717185E+00 |
| L4A1 | 3.517846E+01 | -6.746678E+01 | 4.984777E+00 | 4.884212E+00 | 1.338494E+01 |
| L4A2 | 3.465979E+01 | -2.490288E+01 | -1.118198E+01 | -4.884405E-01 | -1.298671E+00 |
| L5A1 | 3.868785E+00 | 4.670296E+00 | -7.885808E+00 | 8.123099E-02 | -1.556356E+00 |
| L5A2 | 4.614475E+01 | -4.104236E+01 | 1.009252E+00 | -5.048535E-01 | -1.476472E+00 |
| L6A1 | 2.521516E+00 | 6.334874E-01 | -1.336307E+01 | -2.214784E-01 | 9.327113E-01 |
| L6A2 | 2.509263E-01 | 1.220876E-01 | -1.267774E-01 | -5.397118E-01 | -3.731555E-01 |

FIG. 9

Longitudinal
spherical aber.
field
1.000

-0.025    0    0.005
(mm)

Field curvature
(sagittal direction)
image height (mm)
1.178

-0.05    0
(mm)

| | 500 nm | ---- 800 nm |
| --- | --- | --- |
| | 600 nm | 900 nm |
| | 700 nm | 1000 nm |

Field curvature
(Tangential direction)
image height (mm)
1.178

-0.05    0    0.25
(mm)

Distortion
image height (mm)
1.178

0    50
(%)

| Embodiment 2 | | | | | | | |
|---|---|---|---|---|---|---|---|
| EFL = 1.127 mm ; HFOV = 35.409 degrees ; TTL = 4.469 mm | | | | | | | |
| Fno = 2.000 ; Image Height = 1.178 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| L1A1 | 1st lens element | 1.271 | 0.356 | 1.545 | 55.987 | -2.384 | Plastic |
| L1A2 | | 0.579 | 0.523 | | | | |
| L2A1 | 2nd lens element | 90.604 | 0.356 | 1.585 | 29.907 | 4.790 | Plastic |
| L2A2 | | -2.884 | 0.093 | | | | |
| STO | Aperture stop | INFINITY | 0.040 | | | | |
| L3A1 | 3rd lens element | 2.366 | 0.635 | 1.545 | 55.987 | 1.626 | Plastic |
| L3A2 | | -1.279 | 0.002 | | | | |
| L4A1 | 4th lens element | 1.904 | 0.229 | 1.633 | 23.305 | -2.177 | Plastic |
| L4A2 | | 0.761 | 0.092 | | | | |
| L5A1 | 5th lens element | 2.403 | 0.824 | 1.729 | 54.674 | 0.824 | Glass |
| L5A2 | | -0.684 | 0.055 | | | | |
| L6A1 | 6th lens element | -0.485 | 0.240 | 1.699 | 30.051 | -2.734 | Glass |
| L6A2 | | -0.782 | 0.090 | | | | |
| TF1A1 | 1st Filtering unit | INFINITY | 0.210 | 1.517 | 64.167 | | |
| TF1A2 | | INFINITY | 0.131 | | | | |
| TF2A1 | 2nd Filtering unit | INFINITY | 0.400 | 1.517 | 64.167 | | |
| TF2A2 | | INFINITY | 0.193 | | | | |
| IMA | Image plane | INFINITY | | | | | |

FIG. 12

| Embodiment 2 | | | |
|---|---|---|---|
| Aspherical Parameters | | | |
| Surface# | K | a4 | a6 | a8 |
| L1A1 | -3.376080E-01 | 2.116262E-01 | -2.407723E-01 | 1.268480E-01 |
| L1A2 | -2.009255E-01 | 5.242889E-02 | 1.734794E+00 | -1.354242E+01 |
| L2A1 | -4.169239E+01 | 2.814077E-01 | 1.791123E-01 | 3.419085E+00 |
| L2A2 | -4.276935E+01 | 8.522926E-01 | -1.275817E+01 | 1.864727E+02 |
| L3A1 | 1.784259E+01 | 5.086247E-01 | -8.343094E+00 | 9.781775E+01 |
| L3A2 | -1.106950E-01 | -2.577911E-01 | 7.513538E-01 | -9.724172E+00 |
| L4A1 | -2.528517E+01 | -6.660482E-01 | -1.126804E+00 | 7.414014E+00 |
| L4A2 | -5.976531E-02 | -1.428581E+00 | 3.057503E-01 | 5.525742E+00 |
| L5A1 | -3.054934E+01 | 1.065414E-01 | -4.414375E-01 | 4.702122E+00 |
| L5A2 | -2.363199E-01 | 5.437965E-01 | -6.041105E-02 | 4.863114E+00 |
| L6A1 | -3.724005E+00 | -4.842374E-01 | 3.355229E+00 | -9.425312E+00 |
| L6A2 | -8.097898E+00 | 5.585105E-01 | 1.158737E-01 | -1.515765E+00 |
| Surface# | a10 | a12 | a14 | a16 |
| L1A1 | -9.832669E-02 | -1.997250E-02 | -1.706606E-02 | 8.505751E-02 |
| L1A2 | 3.976897E+01 | -3.322824E+01 | -1.572062E+02 | 1.871293E+02 |
| L2A1 | -2.529454E+01 | 5.626377E+01 | -1.328213E+02 | 1.593420E+02 |
| L2A2 | -1.451111E+03 | 5.565700E+03 | -6.846704E+03 | -1.087304E+04 |
| L3A1 | -7.374297E+02 | 2.914381E+03 | -5.313617E+03 | 5.273362E+02 |
| L3A2 | 6.243214E+01 | -2.114851E+02 | 2.170824E+02 | 2.480224E+01 |
| L4A1 | -2.288316E+01 | 3.728369E+01 | -6.241764E+01 | 7.284875E-01 |
| L4A2 | -2.021873E+01 | 3.312258E+01 | -2.420531E+01 | -1.057572E+01 |
| L5A1 | -8.701328E+00 | 4.027150E+00 | 4.378464E+00 | -7.545653E+00 |
| L5A2 | -1.840019E+01 | 4.824095E+01 | -4.261441E+01 | 1.128562E+00 |
| L6A1 | 9.804949E+00 | 2.496888E+00 | 6.983343E-01 | -1.437986E+01 |
| L6A2 | 1.596518E+00 | 1.880523E-01 | -1.624256E-01 | -3.048733E-01 |

FIG. 13

Longitudinal
spherical aber.
field
1.000

-0.01          0          0.008
(mm)

Field curvature
(sagittal direction)
image height (mm)
0.915

-0.025          0
(mm)

| | 500 nm | ---- | 800 nm |
| -·-· | 600 nm | -··- | 900 nm |
| --- | 700 nm | ······ | 1000 nm |

Field curvature
(Tangential direction)
image height (mm)
0.915

-0.025          0
(mm)

Distortion
image height (mm)
0.915

-80          0
(%)

| | | | | | | | |
|---|---|---|---|---|---|---|---|
| Embodiment 3 | | | | | | | |
| EFL = 0.861 mm ; HFOV = 75.552 degrees ; TTL = 4.508 mm | | | | | | | |
| Fno = 2.000 ; Image Height = 0.915 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| L1A1 | 1st lens element | -6.153 | 0.417 | 1.545 | 55.987 | -1.166 | Plastic |
| L1A2 | | 0.724 | 0.601 | | | | |
| L2A1 | 2nd lens element | 18.681 | 0.418 | 1.661 | 20.373 | 3.525 | Plastic |
| L2A2 | | -2.632 | 0.048 | | | | |
| STO | Aperture stop | INFINITY | 0.055 | | | | |
| L3A1 | 3rd lens element | -44.606 | 0.481 | 1.545 | 55.987 | 1.428 | Plastic |
| L3A2 | | -0.766 | 0.017 | | | | |
| L4A1 | 4th lens element | 1.950 | 0.230 | 1.661 | 20.373 | -1.819 | Plastic |
| L4A2 | | 0.708 | 0.065 | | | | |
| L5A1 | 5th lens element | 1.190 | 0.887 | 1.693 | 52.931 | 0.923 | Glass |
| L5A2 | | -0.960 | 0.047 | | | | |
| L6A1 | 6th lens element | -0.754 | 0.240 | 1.642 | 22.409 | -1.731 | Plastic |
| L6A2 | | -2.645 | 0.154 | | | | |
| TF1A1 | 1st Filtering unit | INFINITY | 0.210 | 1.517 | 64.167 | | |
| TF1A2 | | INFINITY | 0.130 | | | | |
| TF2A1 | 2nd Filtering unit | INFINITY | 0.400 | 1.517 | 64.167 | | |
| TF2A2 | | INFINITY | 0.107 | | | | |
| IMA | Image plane | INFINITY | | | | | |

FIG. 16

| Embodiment 3 | | | |
|---|---|---|---|
| Aspherical Parameters | | | |
| Surface# | K | a4 | a6 | a8 |
| L1A1 | 1.712617E+01 | 1.873986E-01 | -2.171596E-01 | 1.606674E-01 |
| L1A2 | 0.000000E+00 | 4.409401E-01 | 1.950153E+00 | -9.786037E+00 |
| L2A1 | 0.000000E+00 | -1.671174E-02 | -3.956345E-03 | 2.927049E+00 |
| L2A2 | 0.000000E+00 | 7.838228E-01 | -1.335791E+01 | 1.771284E+02 |
| L3A1 | -6.092521E+02 | 3.998565E-01 | -8.204218E+00 | 9.181459E+01 |
| L3A2 | -1.303321E-01 | -2.312311E-01 | 7.477934E-01 | -9.719302E+00 |
| L4A1 | -1.226601E+01 | -6.579955E-01 | -1.026861E+00 | 7.483456E+00 |
| L4A2 | -1.780703E-01 | -1.230435E+00 | 1.857237E-01 | 5.135301E+00 |
| L5A1 | -5.657749E+00 | 9.353580E-02 | -5.300486E-01 | 3.381243E+00 |
| L5A2 | -7.460898E-02 | -2.313892E-02 | 2.594808E-01 | 5.129497E+00 |
| L6A1 | -6.057253E+00 | -6.374564E-01 | 3.806580E+00 | -8.493518E+00 |
| L6A2 | -6.634339E+01 | 3.848051E-01 | 1.632930E-01 | -1.479576E+00 |
| Surface# | a10 | a12 | a14 | a16 |
| L1A1 | -7.576663E-02 | 2.027861E-02 | -1.821780E-03 | 0.000000E+00 |
| L1A2 | 3.792884E+01 | -3.921343E+01 | -2.883701E+01 | 0.000000E+00 |
| L2A1 | -2.390345E+01 | 6.081717E+01 | -7.876096E+01 | 0.000000E+00 |
| L2A2 | -1.232546E+03 | 4.408644E+03 | -6.253107E+03 | 0.000000E+00 |
| L3A1 | -6.308541E+02 | 2.090296E+03 | -2.747748E+03 | -3.029947E+02 |
| L3A2 | 5.294071E+01 | -1.621438E+02 | 1.790810E+02 | -5.527297E+01 |
| L4A1 | -2.571564E+01 | 4.226424E+01 | -2.857476E+01 | 2.302438E+01 |
| L4A2 | -1.938330E+01 | 2.904943E+01 | -2.449548E+01 | 5.759363E+00 |
| L5A1 | -6.550278E+00 | 3.589257E+00 | 2.217026E+00 | -2.705275E+00 |
| L5A2 | -2.249214E+01 | 4.132737E+01 | -3.346248E+01 | 1.022498E+01 |
| L6A1 | 7.524787E+00 | -3.065032E-01 | -1.196169E+00 | -3.358715E-01 |
| L6A2 | 1.586114E+00 | -2.305941E-01 | -1.823439E-01 | -1.527847E-01 |

FIG. 17

Longitudinal
spherical aber.
field
1.000

-0.06    0    0.02
(mm)

Field curvature
(sagittal direction)
image height (mm)
1.178

-0.02    0    0.04
(mm)

| 500 nm | ---- 800 nm |
| 600 nm | ---- 900 nm |
| 700 nm | ...... 1000 nm |

Field curvature
(Tangential direction)
image height (mm)
1.178

-0.05    0    0.1
(mm)

Distortion
image height (mm)
1.178

-60    0    10
(%)

| Embodiment 4 | | | | | | | |
|---|---|---|---|---|---|---|---|
| EFL = 0.892 mm ; HFOV = 69.313 degrees ; TTL = 4.752 mm | | | | | | | |
| Fno = 2.000 ; Image Height = 1.178 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| L1A1 | 1st lens element | -4.730 | 0.346 | 1.544 | 49.922 | -1.129 | Plastic |
| L1A2 | | 0.724 | 0.620 | | | | |
| L2A1 | 2nd lens element | 16.473 | 0.574 | 1.645 | 22.478 | 3.521 | Plastic |
| L2A2 | | -2.589 | 0.020 | | | | |
| STO | Aperture stop | INFINITY | 0.022 | | | | |
| L3A1 | 3rd lens element | -101.528 | 0.564 | 1.545 | 55.987 | 1.478 | Plastic |
| L3A2 | | -0.799 | 0.045 | | | | |
| L4A1 | 4th lens element | 1.918 | 0.224 | 1.645 | 22.478 | -1.908 | Plastic |
| L4A2 | | 0.714 | 0.075 | | | | |
| L5A1 | 5th lens element | 1.356 | 0.812 | 1.693 | 52.931 | 0.974 | Glass |
| L5A2 | | -1.013 | 0.079 | | | | |
| L6A1 | 6th lens element | -0.620 | 0.237 | 1.642 | 22.409 | -1.853 | Plastic |
| L6A2 | | -1.492 | 0.226 | | | | |
| TF1A1 | 1st Filtering unit | INFINITY | 0.210 | 1.517 | 64.167 | | |
| TF1A2 | | INFINITY | 0.118 | | | | |
| TF2A1 | 2nd Filtering unit | INFINITY | 0.400 | 1.517 | 64.167 | | |
| TF2A2 | | INFINITY | 0.180 | | | | |
| IMA | Image plane | INFINITY | | | | | |

FIG. 20

| Embodiment 4 | | | |
|---|---|---|---|
| Aspherical Parameters | | | |
| Surface# | K | a4 | a6 | a8 |
| L1A1 | -8.804319E+01 | 2.093821E-01 | -2.271922E-01 | 1.544269E-01 |
| L1A2 | 0.000000E+00 | 1.270205E-01 | 2.801873E+00 | -1.368139E+01 |
| L2A1 | 0.000000E+00 | -1.388200E-01 | -2.479228E-01 | 2.915022E+00 |
| L2A2 | 0.000000E+00 | 7.497227E-01 | -1.317306E+01 | 1.761230E+02 |
| L3A1 | 1.432971E+02 | 4.802130E-01 | -8.179773E+00 | 9.013359E+01 |
| L3A2 | -1.411742E-01 | -2.512605E-01 | 7.691636E-01 | -9.242536E+00 |
| L4A1 | -1.357806E+01 | -6.524865E-01 | -9.592049E-01 | 7.736012E+00 |
| L4A2 | -1.882655E-01 | -1.219793E+00 | 1.001933E-01 | 4.955555E+00 |
| L5A1 | -6.764978E+00 | 1.511807E-02 | -5.091230E-01 | 3.556856E+00 |
| L5A2 | -1.465423E-01 | 1.189538E-01 | 1.982898E-01 | 5.038143E+00 |
| L6A1 | -5.405288E+00 | -3.910203E-01 | 3.674024E+00 | -8.869533E+00 |
| L6A2 | -4.526248E+01 | 4.301936E-01 | 1.334628E-01 | -1.576632E+00 |
| Surface# | a10 | a12 | a14 | a16 |
| L1A1 | -7.416503E-02 | 2.311568E-02 | -3.323691E-03 | 0.000000E+00 |
| L1A2 | 3.895209E+01 | -2.475785E+01 | -5.443593E+01 | 0.000000E+00 |
| L2A1 | -2.520875E+01 | 4.711716E+01 | -2.660777E+01 | 0.000000E+00 |
| L2A2 | -1.251274E+03 | 4.311567E+03 | -5.599387E+03 | 0.000000E+00 |
| L3A1 | -6.356376E+02 | 2.070029E+03 | -2.651231E+03 | 3.257266E+02 |
| L3A2 | 5.518696E+01 | -1.687449E+02 | 1.849528E+02 | -2.120668E+01 |
| L4A1 | -2.541018E+01 | 4.256322E+01 | -3.103712E+01 | 1.262335E+01 |
| L4A2 | -1.909958E+01 | 3.008765E+01 | -2.333654E+01 | 2.566930E+00 |
| L5A1 | -6.572082E+00 | 3.120382E+00 | 1.571824E+00 | -1.207680E+00 |
| L5A2 | -2.270587E+01 | 4.099571E+01 | -3.373507E+01 | 1.048909E+01 |
| L6A1 | 7.238001E+00 | -6.142671E-01 | -1.233647E+00 | 1.929518E-01 |
| L6A2 | 1.544413E+00 | -2.199260E-01 | -6.190455E-02 | -1.446793E-01 |

FIG. 21

Longitudinal
spherical aber.
field
1.000

-0.04    0    0.02
(mm)

Field curvature
(sagittal direction)
image height (mm)
1.036

-0.04    0    0.02
(mm)

| —— 500 nm | - - - - 800 nm |
| —·—· 600 nm | —·· — 900 nm |
| — — 700 nm | ········ 1000 nm |

Field curvature
(Tangential direction)
image height (mm)
1.036

-0.045    0    0.03
(mm)

Distortion
image height (mm)
1.036

-80    0   10
(%)

| Embodiment 5 | | | | | | | |
|---|---|---|---|---|---|---|---|
| EFL = 0.927 mm ; HFOV = 75.552 degrees ; TTL = 4.286 mm | | | | | | | |
| Fno = 2.000 ; Image Height = 1.036 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| L1A1 | 1st lens element | -7.946 | 0.333 | 1.545 | 56.708 | -1.301 | Plastic |
| L1A2 | | 0.788 | 0.549 | | | | |
| L2A1 | 2nd lens element | 11.757 | 0.333 | 1.671 | 19.276 | 3.203 | Plastic |
| L2A2 | | -2.593 | 0.022 | | | | |
| STO | Aperture stop | INFINITY | 0.025 | | | | |
| L3A1 | 3rd lens element | -60.972 | 0.630 | 1.545 | 56.708 | 1.466 | Plastic |
| L3A2 | | -0.790 | 0.023 | | | | |
| L4A1 | 4th lens element | 1.887 | 0.227 | 1.671 | 19.276 | -1.853 | Plastic |
| L4A2 | | 0.712 | 0.065 | | | | |
| L5A1 | 5th lens element | 1.339 | 0.782 | 1.743 | 49.296 | 0.899 | Glass |
| L5A2 | | -0.998 | 0.051 | | | | |
| L6A1 | 6th lens element | -0.657 | 0.221 | 1.544 | 49.922 | -1.735 | Plastic |
| L6A2 | | -2.426 | 0.165 | | | | |
| TF1A1 | 1st Filtering unit | INFINITY | 0.210 | 1.517 | 64.167 | | |
| TF1A2 | | INFINITY | 0.131 | | | | |
| TF2A1 | 2nd Filtering unit | INFINITY | 0.400 | 1.517 | 64.167 | | |
| TF2A2 | | INFINITY | 0.118 | | | | |
| IMA | Image plane | INFINITY | | | | | |

FIG. 24

| Embodiment 5 | | | |
|---|---|---|---|
| Aspherical Parameters | | | |
| Surface# | K | a4 | a6 | a8 |
| L1A1 | 2.678861E+01 | 1.962336E-01 | -2.343239E-01 | 1.525581E-01 |
| L1A2 | 0.000000E+00 | 2.545950E-01 | 3.405713E+00 | -1.358929E+01 |
| L2A1 | 0.000000E+00 | -1.811585E-02 | 4.063237E-01 | 2.968548E+00 |
| L2A2 | 0.000000E+00 | 7.898221E-01 | -1.296726E+01 | 1.774370E+02 |
| L3A1 | -2.069995E+15 | 4.521630E-01 | -8.030461E+00 | 9.131723E+01 |
| L3A2 | -1.304303E-01 | -2.546005E-01 | 7.938734E-01 | -9.116385E+00 |
| L4A1 | -1.330844E+01 | -6.564537E-01 | -1.002496E+00 | 7.641935E+00 |
| L4A2 | -1.876138E-01 | -1.200234E+00 | 1.272397E-01 | 4.997162E+00 |
| L5A1 | -5.835633E+00 | 3.170985E-02 | -5.276061E-01 | 3.549517E+00 |
| L5A2 | -1.258594E-01 | 8.283051E-02 | 1.878361E-01 | 5.040342E+00 |
| L6A1 | -5.394090E+00 | -3.475173E-01 | 3.722140E+00 | -8.823347E+00 |
| L6A2 | -2.771874E+02 | 5.023676E-01 | 1.373409E-01 | -1.570560E+00 |
| Surface# | a10 | a12 | a14 | a16 |
| L1A1 | -7.220239E-02 | 2.472081E-02 | -3.734674E-03 | 0.000000E+00 |
| L1A2 | 3.735877E+01 | -2.920316E+01 | -5.741928E+01 | 0.000000E+00 |
| L2A1 | -2.742244E+01 | 4.932243E+01 | -1.090411E+01 | 0.000000E+00 |
| L2A2 | -1.247571E+03 | 4.318143E+03 | -5.589812E+03 | 0.000000E+00 |
| L3A1 | -6.326943E+02 | 2.092416E+03 | -2.609798E+03 | 2.944773E+02 |
| L3A2 | 5.557483E+01 | -1.619793E+02 | 1.802983E+02 | -3.016036E+01 |
| L4A1 | -2.528777E+01 | 4.287100E+01 | -3.037600E+01 | 1.098494E+01 |
| L4A2 | -1.906889E+01 | 3.020562E+01 | -2.335780E+01 | 2.627280E+00 |
| L5A1 | -6.553782E+00 | 3.107547E+00 | 1.589201E+00 | -1.144683E+00 |
| L5A2 | -2.270482E+01 | 4.096407E+01 | -3.373669E+01 | 1.042650E+01 |
| L6A1 | 7.262626E+00 | -5.993192E-01 | -1.229371E+00 | 2.762243E-01 |
| L6A2 | 1.542045E+00 | -2.297806E-01 | -7.181843E-02 | -1.652891E-01 |

FIG. 25

Longitudinal
spherical aber.
field
1.000

-0.06    0    0.02
(mm)

Field curvature
(sagittal direction)
image height (mm)
1.154

-0.06    0    0.02
(mm)

| 500 nm | 800 nm |
| 600 nm | 900 nm |
| 700 nm | 1000 nm |

Field curvature
(Tangential direction)
image height (mm)
1.154

-0.06    0    0.03
(mm)

Distortion
image height (mm)
1.154

-70    0
(%)

| Surface # | | Radius of curvature (mm) | Thickness /air gap (mm) | Refractive index | Abbe number | Focal length (mm) | Material |
|---|---|---|---|---|---|---|---|
| Embodiment 6 | | | | | | | |
| EFL = 1.129 mm ; HFOV = 70.278 degrees ; TTL = 7.754 mm | | | | | | | |
| Fno = 2.000 ; Image Height = 1.154 mm | | | | | | | |
| OBJ | Object | INFINITY | INFINITY | | | | |
| L1A1 | 1st lens element | -12.237 | 0.527 | 1.545 | 55.987 | -1.823 | Plastic |
| L1A2 | | 1.095 | 0.812 | | | | |
| L2A1 | 2nd lens element | 29.168 | 1.445 | 1.661 | 20.373 | 5.909 | Plastic |
| L2A2 | | -4.409 | 0.049 | | | | |
| STO | Aperture stop | INFINITY | 0.005 | | | | |
| L3A1 | 3rd lens element | -269.001 | 1.172 | 1.545 | 55.987 | 2.319 | Plastic |
| L3A2 | | -1.257 | 0.022 | | | | |
| L4A1 | 4th lens element | 3.103 | 0.304 | 1.661 | 20.373 | -2.621 | Plastic |
| L4A2 | | 1.067 | 0.088 | | | | |
| L5A1 | 5th lens element | 2.036 | 1.203 | 1.764 | 49.097 | 1.324 | Glass |
| L5A2 | | -1.494 | 0.061 | | | | |
| L6A1 | 6th lens element | -1.035 | 0.372 | 1.544 | 49.922 | -2.988 | Plastic |
| L6A2 | | -3.211 | 0.327 | | | | |
| TF1A1 | 1st Filtering unit | INFINITY | 0.315 | 1.517 | 64.167 | | |
| TF1A2 | | INFINITY | 0.197 | | | | |
| TF2A1 | 2nd Filtering unit | INFINITY | 0.600 | 1.517 | 64.167 | | |
| TF2A2 | | INFINITY | 0.256 | | | | |
| IMA | Image plane | INFINITY | | | | | |

FIG. 28

| Embodiment 6 | | | |
|---|---|---|---|
| Aspherical Parameters | | | |
| Surface# | K | a4 | a6 | a8 |
| L1A1 | 1.670729E+01 | 5.802245E-02 | -3.045006E-02 | 8.955397E-03 |
| L1A2 | 3.757243E-02 | 5.878290E-02 | 3.902656E-01 | -7.834942E-01 |
| L2A1 | 9.292972E+02 | 8.586936E-03 | 4.029625E-02 | 2.615031E-01 |
| L2A2 | -5.850449E+00 | 2.234875E-01 | -1.734135E+00 | 1.032724E+01 |
| L3A1 | -5.213315E+04 | 1.240598E-01 | -1.053279E+00 | 5.397714E+00 |
| L3A2 | -1.682332E-01 | -6.922605E-02 | 1.071648E-01 | -5.285749E-01 |
| L4A1 | -2.131566E+01 | -2.099770E-01 | -1.291127E-01 | 4.354722E-01 |
| L4A2 | -1.876959E-01 | -3.572223E-01 | 1.763474E-02 | 2.941306E-01 |
| L5A1 | -5.347640E+00 | 1.337497E-02 | -6.954134E-02 | 2.088994E-01 |
| L5A2 | -1.248072E-01 | 2.711238E-02 | 2.470888E-02 | 2.941858E-01 |
| L6A1 | -5.783362E+00 | -9.337816E-02 | 4.982557E-01 | -5.122152E-01 |
| L6A2 | -8.339365E+01 | 1.225302E-01 | 1.435078E-02 | -9.333988E-02 |
| Surface# | a10 | a12 | a14 | a16 |
| L1A1 | -1.948098E-03 | 2.654987E-04 | -1.595592E-05 | 1.839915E-07 |
| L1A2 | 1.040720E+00 | -2.637789E-01 | -2.505135E-01 | 1.864513E-02 |
| L2A1 | -6.179267E-01 | 5.590745E-01 | -1.595760E-01 | -6.183636E-03 |
| L2A2 | -3.233965E+01 | 5.055590E+01 | -2.918927E+01 | -2.095587E+00 |
| L3A1 | -1.635514E+01 | 2.423768E+01 | -1.331000E+01 | 7.303341E-01 |
| L3A2 | 1.460206E+00 | -1.869792E+00 | 9.264115E-01 | -5.071074E-02 |
| L4A1 | -6.641478E-01 | 4.953584E-01 | -1.483952E-01 | 3.378800E-02 |
| L4A2 | -4.952016E-01 | 3.492354E-01 | -1.207577E-01 | 5.022384E-03 |
| L5A1 | -1.696181E-01 | 3.533155E-02 | 8.043948E-03 | -2.438518E-03 |
| L5A2 | -5.893039E-01 | 4.755781E-01 | -1.730706E-01 | 2.386449E-02 |
| L6A1 | 1.903980E-01 | -6.735774E-03 | -6.338600E-03 | 6.979356E-04 |
| L6A2 | 3.995148E-02 | -2.524979E-03 | -2.156387E-04 | -2.515165E-04 |

FIG. 29

Longitudinal
spherical aber.
field
1.000

-0.03          0          0.04
(mm)

Field curvature
(sagittal direction)
image height (mm)
1.178

-0.01    0    0.04
(mm)

| | 500 nm | ---- | 800 nm |
| | 600 nm | ---- | 900 nm |
| | 700 nm | ...... | 1000 nm |

Field curvature
(Tangential direction)
image height (mm)
1.178

-0.04    0         0.07
(mm)

Distortion
image height (mm)
1.178

0                    50
(%)

| Embodiment 7 | | | | | | | |
|---|---|---|---|---|---|---|---|
| EFL = 0.954 mm ; HFOV = 40.196 degrees ; TTL = 4.346 mm | | | | | | | |
| Fno = 2.000 ; Image Height = 1.178 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| L1A1 | 1st lens element | 1.496 | 0.398 | 1.536 | 55.981 | -2.326 | Plastic |
| L1A2 | | 0.617 | 0.522 | | | | |
| L2A1 | 2nd lens element | 31.382 | 0.414 | 1.648 | 33.794 | 5.370 | Glass |
| L2A2 | | -3.887 | 0.070 | | | | |
| STO | Aperture stop | INFINITY | 0.033 | | | | |
| L3A1 | 3rd lens element | 2.351 | 0.500 | 1.535 | 55.690 | 1.545 | Plastic |
| L3A2 | | -1.179 | 0.019 | | | | |
| L4A1 | 4th lens element | 1.896 | 0.208 | 1.671 | 19.243 | -2.245 | Plastic |
| L4A2 | | 0.802 | 0.089 | | | | |
| L5A1 | 5th lens element | 4.168 | 0.927 | 1.694 | 53.330 | 0.903 | Glass |
| L5A2 | | -0.669 | 0.039 | | | | |
| L6A1 | 6th lens element | -0.414 | 0.152 | 1.642 | 22.409 | -14.987 | Plastic |
| L6A2 | | -0.495 | 0.043 | | | | |
| TF1A1 | 1st Filtering unit | INFINITY | 0.210 | 1.517 | 64.167 | | |
| TF1A2 | | INFINITY | 0.131 | | | | |
| TF2A1 | 2nd Filtering unit | INFINITY | 0.400 | 1.517 | 64.167 | | |
| TF2A2 | | INFINITY | 0.193 | | | | |
| IMA | Image plane | INFINITY | | | | | |

FIG. 32

| Embodiment 7 | | | |
|---|---|---|---|
| Aspherical Parameters | | | |
| Surface# | K | a4 | a6 | a8 |
| L1A1 | -4.653919E-01 | 2.189487E-01 | -2.208933E-01 | 1.161227E-01 |
| L1A2 | -2.063165E-01 | 1.316979E-01 | 1.590780E+00 | -1.392249E+01 |
| L2A1 | 5.499866E+01 | 2.499416E-01 | 1.073118E-01 | 4.205160E+00 |
| L2A2 | -4.533273E+01 | 8.311430E-01 | -1.163717E+01 | 1.832865E+02 |
| L3A1 | 1.711559E+01 | 4.896972E-01 | -9.018662E+00 | 1.034094E+02 |
| L3A2 | -8.505018E-02 | -2.373177E-01 | 6.865761E-01 | -1.003002E+01 |
| L4A1 | -1.915826E+01 | -6.451479E-01 | -1.079907E+00 | 7.582795E+00 |
| L4A2 | -4.180708E-02 | -1.364358E+00 | 3.909116E-01 | 5.265132E+00 |
| L5A1 | -4.149430E+01 | 9.259380E-02 | -4.416767E-01 | 4.409425E+00 |
| L5A2 | -3.105624E-01 | 5.769128E-01 | -1.263183E-02 | 4.653256E+00 |
| L6A1 | -4.169280E+00 | -4.358349E-01 | 3.233979E+00 | -8.712160E+00 |
| L6A2 | -4.395952E+00 | 5.373564E-01 | 1.097983E-01 | -1.632134E+00 |
| Surface# | a10 | a12 | a14 | a16 |
| L1A1 | -1.126147E-01 | -3.043343E-02 | -3.426564E-02 | 6.787783E-02 |
| L1A2 | 4.163217E+01 | -3.081869E+01 | -1.488504E+02 | 1.971944E+02 |
| L2A1 | -2.093603E+01 | 6.120322E+01 | -1.484766E+02 | 2.075360E+02 |
| L2A2 | -1.459556E+03 | 5.792726E+03 | -7.620783E+03 | -7.552866E+03 |
| L3A1 | -7.169427E+02 | 2.560761E+03 | -5.528463E+03 | 7.445649E+03 |
| L3A2 | 6.257286E+01 | -2.014169E+02 | 7.210706E+01 | 2.021478E+02 |
| L4A1 | -2.283447E+01 | 3.639713E+01 | -6.920808E+01 | -2.966441E+01 |
| L4A2 | -2.025102E+01 | 3.617547E+01 | -3.766696E+01 | -2.621967E+00 |
| L5A1 | -8.470450E+00 | 3.377319E+00 | 2.425558E+00 | -1.404383E+01 |
| L5A2 | -1.930079E+01 | 4.655822E+01 | -3.986680E+01 | 9.688257E-01 |
| L6A1 | 8.800034E+00 | 2.150019E+00 | 6.089524E-01 | -1.459906E+01 |
| L6A2 | 1.616476E+00 | 3.138484E-01 | -2.182376E-01 | -4.557090E-01 |

FIG. 33

Longitudinal
spherical aber.
field
1.000

-0.03    0    0.015
(mm)

Field curvature
(sagittal direction)
image height (mm)
1.178

-0.06    0    0.05
(mm)

| | 500 nm | | 800 nm |
| | 600 nm | | 900 nm |
| | 700 nm | | 1000 nm |

Field curvature
(Tangential direction)
image height (mm)
1.178

-0.06    0    0.1
(mm)

Distortion
image height (mm)
1.178

-80    0
(%)

| Embodiment 8 | | | | | | | |
|---|---|---|---|---|---|---|---|
| EFL = 0.582 mm ; HFOV = 70.211 degrees ; TTL = 4.440 mm | | | | | | | |
| Fno = 2.000 ; Image Height = 1.178 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| L1A1 | 1st lens element | -8.385 | 0.538 | 1.661 | 20.373 | -1.098 | Plastic |
| L1A2 | | 0.813 | 0.577 | | | | |
| L2A1 | 2nd lens element | -1.986 | 0.642 | 1.642 | 22.409 | -37.508 | Plastic |
| L2A2 | | -2.439 | 0.046 | | | | |
| STO | Aperture stop | INFINITY | -0.001 | | | | |
| L3A1 | 3rd lens element | 783.111 | 0.508 | 1.661 | 20.373 | 1.216 | Plastic |
| L3A2 | | -0.802 | 0.015 | | | | |
| L4A1 | 4th lens element | 1.822 | 0.207 | 1.642 | 22.409 | -2.008 | Plastic |
| L4A2 | | 0.720 | 0.046 | | | | |
| L5A1 | 5th lens element | 1.249 | 0.537 | 1.693 | 52.931 | 0.866 | Glass |
| L5A2 | | -0.949 | 0.045 | | | | |
| L6A1 | 6th lens element | -0.808 | 0.180 | 1.642 | 22.409 | -2.316 | Plastic |
| L6A2 | | -1.930 | 0.203 | | | | |
| TF1A1 | 1st Filtering unit | INFINITY | 0.210 | 1.517 | 64.167 | | |
| TF1A2 | | INFINITY | 0.131 | | | | |
| TF2A1 | 2nd Filtering unit | INFINITY | 0.400 | 1.517 | 64.167 | | |
| TF2A2 | | INFINITY | 0.156 | | | | |
| IMA | Image plane | INFINITY | | | | | |

FIG. 36

| Embodiment 8 | | | |
|---|---|---|---|
| Aspherical Parameters | | | |
| Surface# | K | a4 | a6 | a8 |
| L1A1 | 7.486725E+01 | 1.569449E-01 | -2.507165E-01 | 1.451219E-01 |
| L1A2 | 0.000000E+00 | 2.242678E-01 | 3.692593E+00 | -1.388729E+01 |
| L2A1 | 0.000000E+00 | -7.695007E-02 | 2.127504E-01 | 3.675192E+00 |
| L2A2 | 0.000000E+00 | 8.151440E-01 | -1.288065E+01 | 1.778142E+02 |
| L3A1 | 1.008039E+02 | 3.511971E-01 | -8.525542E+00 | 8.959299E+01 |
| L3A2 | -2.611796E-01 | -2.078089E-01 | 9.281663E-01 | -8.729910E+00 |
| L4A1 | -1.372407E+01 | -6.682727E-01 | -1.047805E+00 | 7.446341E+00 |
| L4A2 | -1.931675E-01 | -1.220020E+00 | 1.243996E-01 | 5.069537E+00 |
| L5A1 | -5.172542E+00 | 5.895797E-02 | -4.994000E-01 | 3.546807E+00 |
| L5A2 | 1.331415E-01 | 4.238095E-02 | 1.249478E-01 | 4.945282E+00 |
| L6A1 | -6.598500E+00 | -3.205478E-01 | 4.003788E+00 | -8.712495E+00 |
| L6A2 | -1.293029E+01 | 5.106983E-01 | 1.468826E-01 | -1.283875E+00 |
| Surface# | a10 | a12 | a14 | a16 |
| L1A1 | -7.602292E-02 | 2.742681E-02 | 5.825021E-03 | 0.000000E+00 |
| L1A2 | 3.229199E+01 | -5.960373E+01 | -1.962976E+02 | 0.000000E+00 |
| L2A1 | -3.939401E+01 | 7.548911E+00 | -3.892498E+02 | 0.000000E+00 |
| L2A2 | -1.247112E+03 | 4.255285E+03 | -6.074823E+03 | 0.000000E+00 |
| L3A1 | -6.270982E+02 | 2.254190E+03 | -2.071918E+03 | 5.389363E+03 |
| L3A2 | 5.694445E+01 | -1.579896E+02 | 1.960211E+02 | 4.857446E+01 |
| L4A1 | -2.584538E+01 | 4.068278E+01 | -4.076911E+01 | -4.097897E+01 |
| L4A2 | -1.887648E+01 | 3.047485E+01 | -2.397441E+01 | -3.694906E+00 |
| L5A1 | -6.560712E+00 | 3.347254E+00 | 3.396911E+00 | 5.714402E+00 |
| L5A2 | -2.284855E+01 | 4.107170E+01 | -3.301120E+01 | 1.305250E+01 |
| L6A1 | 7.392919E+00 | -7.439634E-01 | -2.745058E+00 | -4.993827E+00 |
| L6A2 | 2.505097E+00 | 1.943887E+00 | 3.542177E+00 | 5.584750E+00 |

FIG. 37

| Embodiment | 1st | 2nd | 3rd | 4th |
|---|---|---|---|---|
| T1 | 0.361 | 0.356 | 0.417 | 0.346 |
| G12 | 0.443 | 0.523 | 0.601 | 0.620 |
| T2 | 0.367 | 0.356 | 0.418 | 0.574 |
| G23 | 0.152 | 0.134 | 0.104 | 0.043 |
| T3 | 0.614 | 0.635 | 0.481 | 0.564 |
| G34 | 0.008 | 0.002 | 0.017 | 0.045 |
| T4 | 0.243 | 0.229 | 0.230 | 0.224 |
| G45 | 0.087 | 0.092 | 0.065 | 0.075 |
| T5 | 0.868 | 0.824 | 0.887 | 0.812 |
| G56 | 0.062 | 0.055 | 0.047 | 0.079 |
| T6 | 0.262 | 0.240 | 0.240 | 0.237 |
| G6F1 | 0.084 | 0.090 | 0.154 | 0.226 |
| TTF1 | 0.210 | 0.210 | 0.210 | 0.210 |
| GF12 | 0.131 | 0.131 | 0.130 | 0.118 |
| TTF2 | 0.400 | 0.400 | 0.400 | 0.400 |
| GFP | 0.193 | 0.193 | 0.107 | 0.180 |
| BFL | 1.018 | 1.024 | 1.001 | 1.134 |
| EFL | 1.112 | 1.127 | 0.861 | 0.892 |
| TL | 3.466 | 3.446 | 3.507 | 3.618 |
| TTL | 4.484 | 4.469 | 4.508 | 4.752 |
| ALT | 2.715 | 2.640 | 2.672 | 2.757 |
| AAG | 0.752 | 0.806 | 0.835 | 0.861 |
| HFOV | 33.300 | 35.409 | 75.552 | 69.313 |
| V1 | 55.987 | 55.987 | 55.987 | 49.922 |
| V2 | 22.409 | 29.907 | 20.373 | 22.478 |
| V3 | 55.987 | 55.987 | 55.987 | 55.987 |
| V4 | 22.409 | 23.305 | 20.373 | 22.478 |
| V5 | 52.931 | 54.674 | 52.931 | 52.931 |
| V6 | 22.409 | 30.051 | 22.409 | 22.409 |
| BFL /(G23+G34+G45+G56) | 3.300 | 3.620 | 4.286 | 4.694 |

FIG. 38A

| Embodiment | 1st | 2nd | 3rd | 4th |
|---|---|---|---|---|
| (G12+BFL) /(G23+G34+G45+G56) | 4.737 | 5.470 | 6.861 | 7.262 |
| TTL/AAG | 5.965 | 5.547 | 5.400 | 5.516 |
| ALT/AAG | 3.611 | 3.277 | 3.201 | 3.200 |
| (G45+T5+G56)/(T4+T6) | 2.015 | 2.076 | 2.129 | 2.094 |
| ALT/(G34+T4+G45) | 8.026 | 8.179 | 8.563 | 8.000 |
| ALT/(G56+T6) | 8.400 | 8.968 | 9.309 | 8.735 |
| (V4+V5+V6)/V2 | 4.362 | 3.612 | 4.698 | 4.352 |
| T2/T1 | 1.016 | 1.000 | 1.001 | 1.660 |
| V2+V5+V6 | 97.748 | 114.631 | 95.712 | 97.817 |
| (T1+T4+T6)/T5 | 0.998 | 1.000 | 1.000 | 0.994 |
| AAG/(T2+T3) | 0.766 | 0.813 | 0.929 | 0.757 |
| TL/BFL | 3.405 | 3.366 | 3.504 | 3.192 |
| D11t22/T3 | 1.908 | 1.947 | 2.988 | 2.731 |
| TL/(G23+T3) | 4.528 | 4.484 | 5.999 | 5.968 |
| TTL/(G45+T5) | 4.696 | 4.875 | 4.734 | 5.355 |
| (V2+V3+V4)/(V1+V5) | 0.926 | 0.987 | 0.888 | 0.981 |
| (EFL+AAG)/BFL | 1.831 | 1.888 | 1.694 | 1.547 |
| (EFL+T3+T4)/(T2+T5) | 1.595 | 1.685 | 1.205 | 1.212 |
| HFOV/(EFL+BFL) | 15.632 | 16.465 | 40.582 | 34.220 |
| HFOV/TL | 9.607 | 10.277 | 21.543 | 19.158 |

FIG. 38B

| Embodiment | 5th | 6th | 7th | 8th |
|---|---|---|---|---|
| T1 | 0.333 | 0.527 | 0.398 | 0.538 |
| G12 | 0.549 | 0.812 | 0.522 | 0.577 |
| T2 | 0.333 | 1.445 | 0.414 | 0.642 |
| G23 | 0.047 | 0.054 | 0.103 | 0.045 |
| T3 | 0.630 | 1.172 | 0.500 | 0.508 |
| G34 | 0.023 | 0.022 | 0.019 | 0.015 |
| T4 | 0.227 | 0.304 | 0.208 | 0.207 |
| G45 | 0.065 | 0.088 | 0.089 | 0.046 |
| T5 | 0.782 | 1.203 | 0.927 | 0.537 |
| G56 | 0.051 | 0.061 | 0.039 | 0.045 |
| T6 | 0.221 | 0.372 | 0.152 | 0.180 |
| G6F1 | 0.165 | 0.327 | 0.043 | 0.203 |
| TTF1 | 0.210 | 0.315 | 0.210 | 0.210 |
| GF12 | 0.131 | 0.197 | 0.131 | 0.131 |
| TTF2 | 0.400 | 0.600 | 0.400 | 0.400 |
| GFP | 0.118 | 0.256 | 0.193 | 0.156 |
| BFL | 1.024 | 1.695 | 0.977 | 1.100 |
| EFL | 0.927 | 1.129 | 0.954 | 0.582 |
| TL | 3.262 | 6.059 | 3.369 | 3.340 |
| TTL | 4.286 | 7.754 | 4.346 | 4.440 |
| ALT | 2.526 | 5.023 | 2.598 | 2.612 |
| AAG | 0.736 | 1.037 | 0.771 | 0.728 |
| HFOV | 75.552 | 70.278 | 40.196 | 70.211 |
| V1 | 56.708 | 55.987 | 55.981 | 20.373 |
| V2 | 19.276 | 20.373 | 33.794 | 22.409 |
| V3 | 56.708 | 55.987 | 55.690 | 20.373 |
| V4 | 19.276 | 20.373 | 19.243 | 22.409 |
| V5 | 49.296 | 49.097 | 53.330 | 52.931 |
| V6 | 49.922 | 49.922 | 22.409 | 22.409 |
| BFL /(G23+G34+G45+G56) | 5.487 | 7.530 | 3.917 | 7.291 |

FIG. 38C

| Embodiment | 5th | 6th | 7th | 8th |
|---|---|---|---|---|
| (G12+BFL) /(G23+G34+G45+G56) | 8.431 | 11.136 | 6.009 | 11.115 |
| TTL/AAG | 5.825 | 7.480 | 5.636 | 6.099 |
| ALT/AAG | 3.433 | 4.845 | 3.369 | 3.588 |
| (G45+T5+G56)/(T4+T6) | 2.001 | 2.000 | 2.936 | 1.623 |
| ALT/(G34+T4+G45) | 8.001 | 12.149 | 8.238 | 9.760 |
| ALT/(G56+T6) | 9.285 | 11.581 | 13.648 | 11.609 |
| (V4+V5+V6)/V2 | 6.147 | 5.860 | 2.811 | 4.362 |
| T2/T1 | 1.001 | 2.743 | 1.040 | 1.193 |
| V2+V5+V6 | 118.494 | 119.392 | 109.533 | 97.748 |
| (T1+T4+T6)/T5 | 0.999 | 1.000 | 0.816 | 1.724 |
| AAG/(T2+T3) | 0.764 | 0.396 | 0.844 | 0.633 |
| TL/BFL | 3.187 | 3.576 | 3.448 | 3.036 |
| D11t22/T3 | 1.930 | 2.375 | 2.666 | 3.460 |
| TL/(G23+T3) | 4.818 | 4.943 | 5.588 | 6.040 |
| TTL/(G45+T5) | 5.059 | 6.007 | 4.278 | 7.621 |
| (V2+V3+V4)/(V1+V5) | 0.899 | 0.921 | 0.995 | 0.889 |
| (EFL+AAG)/BFL | 1.624 | 1.278 | 1.766 | 1.191 |
| (EFL+T3+T4)/(T2+T5) | 1.600 | 0.983 | 1.239 | 1.100 |
| HFOV/(EFL+BFL) | 38.732 | 24.891 | 20.811 | 41.733 |
| HFOV/TL | 23.162 | 11.598 | 11.931 | 21.022 |

FIG. 38D

OPTICAL IMAGING LENS

CROSS-REFERENCE TO RELATED APPLICATIONS

This application claims priority to P.R.C. Patent Application No. 202210709577.4 titled "Optical Imaging Lens," filed Jun. 22, 2022, with the State Intellectual Property Office of the People's Republic of China (SIPO).

TECHNICAL FIELD

The present disclosure relates to optical imaging lenses, and particularly, optical imaging lenses having, in some embodiments, six lens elements.

BACKGROUND

As the specifications of mobile electronic devices, such as cell phones, digital cameras, tablet computers, personal digital assistants (PDA), or consumer electronics, such as smart helmets of augmented reality (AR), virtual reality (VR), mixed reality (MR) etc. rapidly evolve, various types of key components, such as optical imaging lenses, are developed. To meet consumers' requests for the two most important features, image quality and volume, with a higher standard nowadays, raising along with the improvement of image sensing technology, desirable objectives for designing an optical imaging lens may not be limited to compact sizes and great imaging quality, but may also include good optical characteristics along with large field of view.

Optical imaging lenses may be applied to photography, video recording, environmental surveillance, driving recording, VR (virtual reality) tracker, face recognition, etc. As the applications grow, demand for optical imaging lenses capable to sensing visible light and NIR (near infrared) light grows. An electronic device may be installed with at least two optical imaging lenses, at least one of which senses visible light and the other one senses NIR light. Such architecture not only increases cost and complexity, but also affects appearance and volume. Accordingly, how to design a dual-band optical imaging lens receiving visible light and NIR light at the same time and providing good imaging quality may be a challenge in the industry.

SUMMARY

The present disclosure provides for optical imaging lenses providing great field of view, small volume, etc. and showing good imaging quality at the same time.

In an example embodiment, an optical imaging lens which may be used to photograph and record video in a mobile electronic device, such as cell phone, digital camera, tablet computer, personal digital assistant (PDA), or a consumer electronic, such as smart helmet of augmented reality (AR), virtual reality (VR), mixed reality (MR), etc. is provided. The optical imaging lens may comprise six lens elements, hereinafter referred to as first, second, third, fourth, fifth and sixth lens elements and positioned sequentially from an object side to an image side along an optical axis. Each of the first, second, third, fourth, fifth and sixth lens elements may also have an object-side surface facing toward the object side and allowing imaging rays to pass through. Each of the first, second, third, fourth, fifth and sixth lens elements may also have an image-side surface facing toward the image side and allowing the imaging rays to pass through. Through designing concave and/or convex surfaces of the six lens elements, the optical imaging lens may increase field of view, shrink its volume and sustain good image quality at the same time.

In the specification, parameters used here are defined, but not limited to, as follows: A thickness of the first lens element along the optical axis is represented by T1. A distance from the image-side surface of the first lens element to the object-side surface of the second lens element along the optical axis, i.e. an air gap between the first lens element and the second lens element along the optical axis, is represented by G12. A thickness of the second lens element along the optical axis is represented by T2. A distance from the image-side surface of the second lens element to the object-side surface of the third lens element along the optical axis, i.e. an air gap between the second lens element and the third lens element along the optical axis, is represented by G23. A thickness of the third lens element along the optical axis is represented by T3. A distance from the image-side surface of the third lens element to the object-side surface of the fourth lens element along the optical axis, i.e. an air gap between the third lens element and the fourth lens element along the optical axis, is represented by G34. A thickness of the fourth lens element along the optical axis is represented by T4. A distance from the image-side surface of the fourth lens element to the object-side surface of the fifth lens element along the optical axis, i.e. an air gap between fourth lens element and the fifth lens element along the optical axis, is represented by G45. A thickness of the fifth lens element along the optical axis is represented by T5. A distance from the image-side surface of the fifth lens element to the object-side surface of the sixth lens element along the optical axis, i.e. an air gap between the fifth lens element and the sixth lens element along the optical axis, is represented by G56. A thickness of the sixth lens element along the optical axis is represented by T6. A distance from the sixth lens element to a first filtering unit along the optical axis is represented by G6F1. A thickness of the first filtering unit along the optical axis is represented by TTF1. An air gap between the first filtering unit to a second filtering unit along the optical axis is represented by GF12. A thickness of the second filtering unit along the optical axis is represented by TTF2. A distance from the second filtering unit to an image plane along the optical axis is represented by GFP. A focal length of the first lens element is represented by f1. A focal length of the second lens element is represented by f2. A focal length of the third lens element is represented by f3. A focal length of the fourth lens element is represented by f4. A focal length of the fifth lens element is represented by f5. A focal length of the sixth lens element is represented by f6. A refractive index of the first lens element is represented by n1. A refractive index of the second lens element is represented by n2. A refractive index of the third lens element is represented by n3. A refractive index of the fourth lens element is represented by n4. A refractive index of the fifth lens element is represented by n5. A refractive index of the sixth lens element is represented by n6. An Abbe number of the first lens element is represented by V1. An Abbe number of the second lens element is represented by V2. An Abbe number of the third lens element is represented by V3. An Abbe number of the fourth lens element is represented by V4. An Abbe number of the fifth lens element is represented by V5. An Abbe number of the sixth lens element is represented by V6. A half field of view of the optical imaging lens is represented by HFOV. A f-number of the optical imaging lens is represented by Fno. An effective focal length of the optical imaging lens is represented by EFL. A distance from the object-side surface of the first lens element to the image plane along the optical axis, i.e. a system length is represented by TTL. A sum of the thicknesses of all six lens elements along the optical axis, i.e. a sum of T1, T2, T3, T4, T5 and T6, is represented by ALT. A sum of five air gaps between the first, second, third, fourth, fifth and sixth lens elements along the optical axis, which means a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis and a distance from the image-side surface of the fifth lens element to the object-side surface of the sixth lens element along the optical axis, i.e. a sum of G12, G23, G34, G45 and G56, is represented by AAG. A back focal length of the optical imaging lens, which is defined as a distance from the image-side surface of the sixth lens element to the image plane along the optical axis, i.e. a sum of G6F1, TTF1, GF12, TTF2 and GFP, is represented by BFL. A distance from the object-side surface of the first lens element to the image-side surface of the sixth lens element along the optical axis is represented by TL. An image height of an image produced by the optical imaging lens on an image plane is represented by ImgH. A distance from the object-side surface of the first lens element to the image-side surface of the second lens element along the optical axis, i.e. a sum of T1, G12 and T2, is represented by D11t22.

In an aspect of the present disclosure, in the optical imaging lens, the first lens element has negative refracting power, an optical axis region of the image-side surface of the second lens element is convex, the fourth lens element has negative refracting power, and a periphery region of the object-side surface of the fourth lens element is concave, the sixth lens element has negative refracting power, and an optical axis region of the object-side surface of the sixth lens element is concave, lens elements of the optical imaging lens are only the six lens elements described above, and the optical imaging lens satisfies the inequality:

$$BFL/(G23+G34+G45+G56) \geq 3.600 \qquad \text{Inequality (1).}$$

In another aspect of the present disclosure, in the optical imaging lens, an optical axis region of the image-side surface of the second lens element is convex, the third lens element has positive refracting power, the fourth lens element has negative refracting power, an optical axis region of the image-side surface of the fifth lens element is convex, an optical axis region of the object-side surface of the sixth lens element is concave, and a periphery region of the image-side surface of the sixth lens element is concave, lens elements of the optical imaging lens are only the six lens elements described above, and the optical imaging lens satisfies:

$$BFL/(G23+G34+G45+G56) \geq 3.300 \qquad \text{Inequality (2).}$$

In yet another aspect of the present disclosure, in the optical imaging lens, the fourth lens element has negative refracting power, a periphery region of the image-side surface of the fifth lens element is convex, the sixth lens element has negative refracting power, an optical axis region of the image-side surface of the sixth lens element is convex, and a periphery region of the image-side surface of the sixth lens element is concave, lens elements of the optical imaging lens are only the six lens elements described above; and the optical imaging lens satisfies:

$$(G12+BFL)/(G23+G34+G45+G56) \geq 3.000 \qquad \text{Inequality (3).}$$

In another example embodiment, other inequality(s), such as those relating to the ratio among parameters could be taken into consideration. For example:

$$D11t22/T3 \leq 3.500 \qquad \text{Inequality (4);}$$

$$V2+V5+V6 \leq 120.000 \qquad \text{Inequality (5);}$$

$$ALT/(G56+T6) \geq 8.400 \qquad \text{Inequality (6);}$$

$$TL/(G23+T3) \leq 6.100 \qquad \text{Inequality (7);}$$

$$(EFL+T3+T4)/(T2+T5) \leq 1.700 \qquad \text{Inequality (8);}$$

$$AAG/(T2+T3) \leq 1.000 \qquad \text{Inequality (9);}$$

$$(T1+T4+T6)/T5 \leq 1.000 \qquad \text{Inequality (10);}$$

$$(V2+V3+V4)/(V1+V5) \leq 1.000 \qquad \text{Inequality (11);}$$

$$ALT/AAG \geq 23.200 \qquad \text{Inequality (12);}$$

$$TTL/(G45+T5) \leq 6.000 \qquad \text{Inequality (13);}$$

$$(EFL+AAG)/BFL \leq 2.000 \qquad \text{Inequality (14);}$$

$$T2/T1 \geq 1.000 \qquad \text{Inequality (15);}$$

$$(G45+T5+G56)/(T4+T6) \geq 1.600 \qquad \text{Inequality (16);}$$

$$(V4+V5+V6)/V2 \geq 2.800 \qquad \text{Inequality (17);}$$

$$ALT/(G34+T4+G45) \geq 8.000 \qquad \text{Inequality (18);}$$

$$TTL/AAG \geq \geq 5.400 \qquad \text{Inequality (19);}$$

$$TL/BFL \leq 3.600 \qquad \text{Inequality (20);}$$

$$HFOV/(EFL+BFL) \geq 15.000 \text{ degrees/mm} \qquad \text{Inequality (21); and/or}$$

$$HFOV/TL \geq 29.500 \text{ degrees/mm} \qquad \text{Inequality (22).}$$

In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated in example embodiments if no inconsistency occurs.

The above example embodiments are not limiting and could be selectively incorporated in other embodiments described herein.

Through designing concave and/or convex surfaces of the lens elements and at least one inequality, the optical imaging lens may provide great field of view, small volume and well image quality at the same time.

BRIEF DESCRIPTION OF THE DRAWINGS

Example embodiments will be more readily understood from the following detailed description when read in conjunction with the appended drawing, in which:

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIGS. 38A, 38B, 38C and 38D depict tables for the values of BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of all eight example embodiments.

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The terms "optical axis region", "periphery region", "concave", and "convex" used in this specification and claims should be interpreted based on the definition listed in the specification by the principle of lexicographer.

Figure 1:
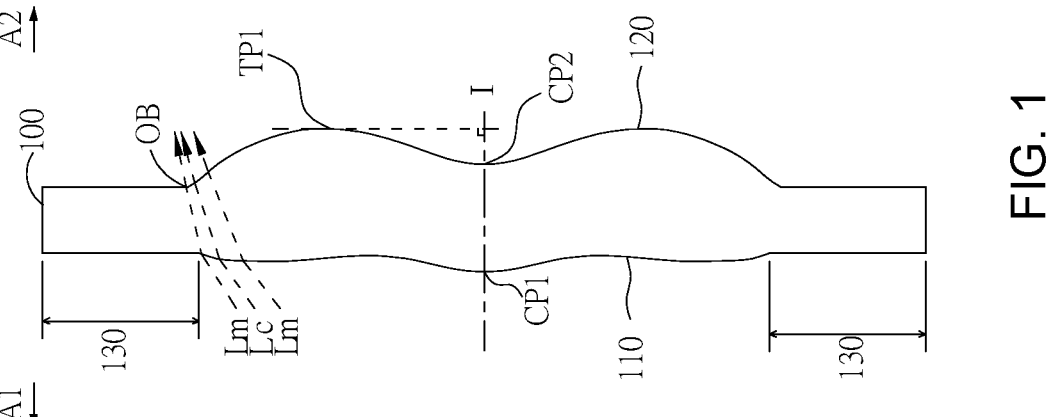
FIG. 1 depicts a cross-sectional view of one single lens element according to the present disclosure.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
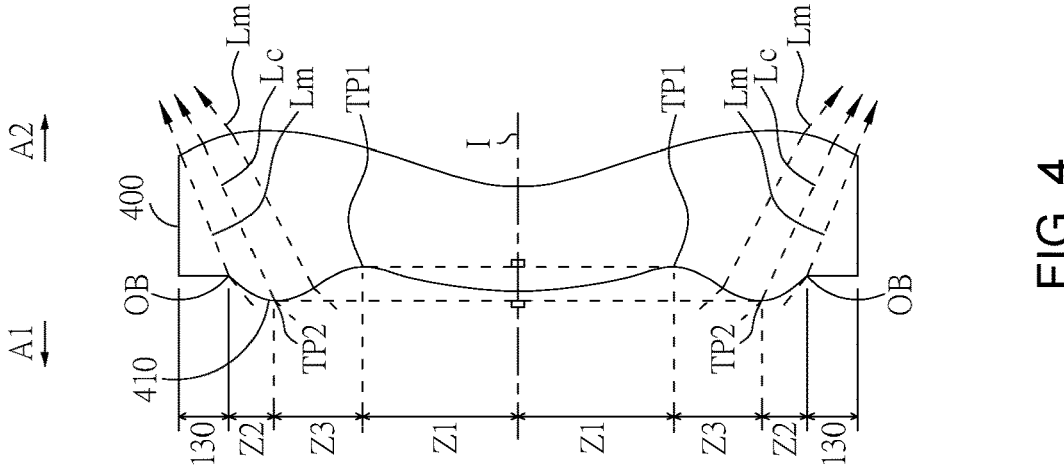
FIG. 4 depicts a cross-sectional view showing a second example of determining the shape of lens element regions and the boundaries of regions.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
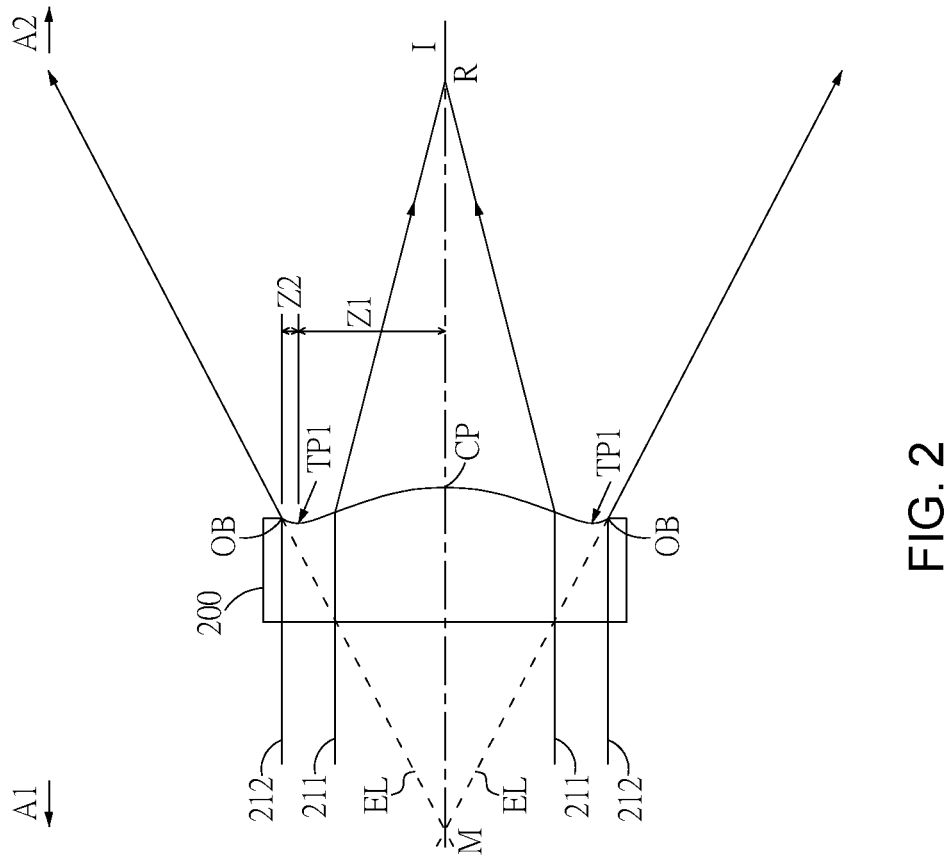
FIG. 2 depicts a cross-sectional view showing the relation between the shape of a portion and the position where a collimated ray meets the optical axis.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
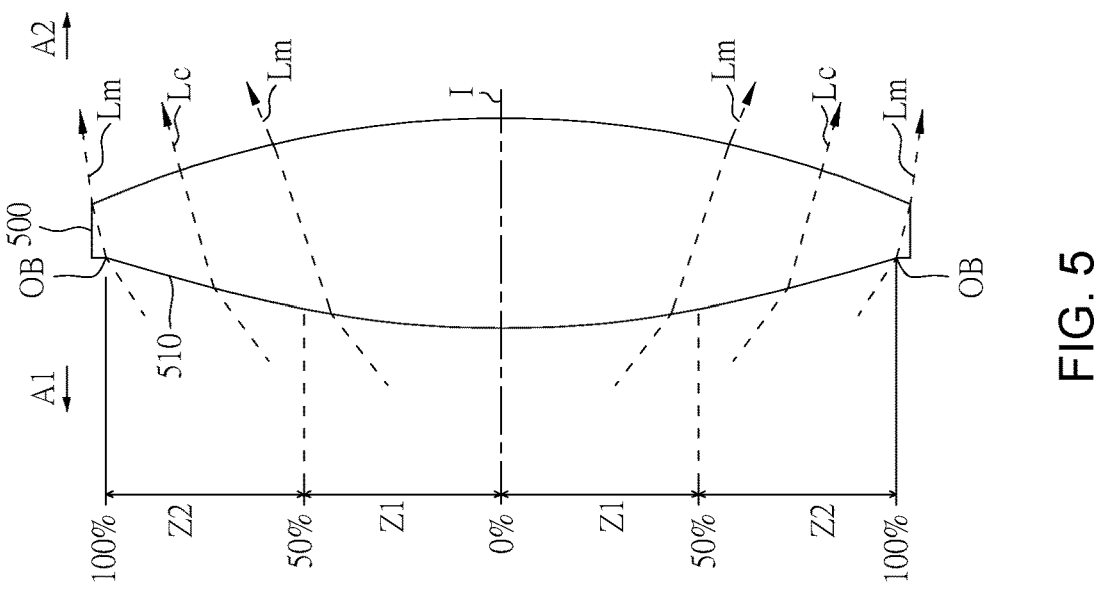
FIG. 5 depicts a cross-sectional view showing a third example of determining the shape of lens element regions and the boundaries of regions.
Figure 3:
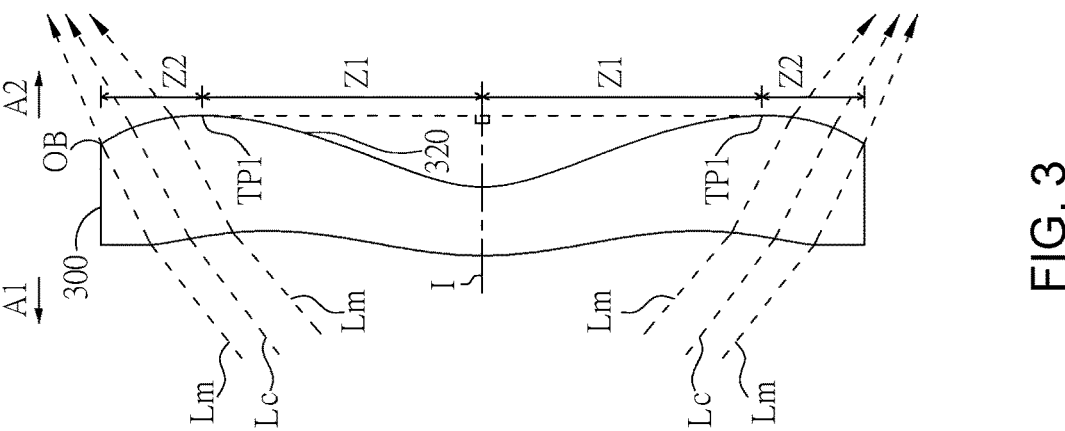
FIG. 3 depicts a cross-sectional view showing a first example of determining the shape of lens element regions and the boundaries of regions.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

In the present disclosure, examples of an optical imaging lens which may be a prime lens are provided. Example embodiments of an optical imaging lens may comprise a first lens element, a second lens element, a third lens element, a fourth lens element, a fifth lens element and a sixth lens element. Each of the lens elements may comprise an object-side surface facing toward an object side allowing imaging rays to pass through and an image-side surface facing toward an image side allowing the imaging rays to pass through. These lens elements may be arranged sequentially from the object side to the image side along an optical axis, and example embodiments of the lens may have refracting power of the optical imaging lens consist of the six lens elements described above. Through controlling shape of the surfaces, the optical imaging lens in example embodiments may achieve good imaging quality and provide increased field of view and shrunk volume.

In some embodiments, the lens elements are designed with refracting power and surface shape. For example, when the negative refracting power of the first lens element and the convex optical axis region of the image-side surface of the second lens element are combined in an optical imaging lens element, it may be beneficial to enlarge the field of view and converge rays coming from different angles. When the negative refracting power of the fourth lens element and the concave periphery region of the object-side surface of the fourth lens element are further combined in the optical imaging lens, it may be beneficial to adjust the aberrations caused by the first and the second lens elements. When the negative refracting power of the sixth lens element and the concave optical axis region of the object-side surface of the sixth lens element are combined and BFL/(G23+G34+G45+G56)≥3.600 is satisfied in the optical imaging lens, it may be beneficial to shrink the volume of the optical imaging lens to present good optical characteristics. Preferably, the optical imaging lens may satisfy 3.600≤BFL/(G23+G34+G45+G56)≤8.200.

When the optical imaging lens further satisfies that the third lens element has the positive refracting power or the fifth lens element has the positive refracting power, it may be beneficial to adjust the aberrations at the center of field of an image plane.

When an optical imaging lens element satisfies that the optical axis region of the image-side surface of the second lens element is convex, the third lens element has the positive refracting power and the fourth lens element has the negative refracting power, it may be beneficial to converge rays passing through the first lens element and adjust its aberrations thereof. When the optical imaging lens element satisfies that the optical axis region of the image-side surface of the fifth lens element is convex, the optical axis region of the object-side surface of the sixth lens element is concave and the periphery region of the image-side surface of the sixth lens element is concave, spherical aberration of the optical imaging lens element may be adjusted. When the optical imaging lens element further satisfies BFL/(G23+G34+G45+G56)≥3.300, the volume of the optical imaging lens element may be shrunk effectively to maintain good optical characteristics. Preferably, the optical imaging lens may satisfy 3.300≤BFL/(G23+G34+G45+G56)≤8.200.

When the optical imaging lenses mentioned above further satisfy that the first lens element has the negative refracting power or the fifth lens element has the positive refracting power or the sixth lens element has the negative refracting power, the field of view may be enlarged and the aberrations at the center of field of an image plane may be adjusted.

When the negative refracting power of the fourth lens element and the convex periphery region of the image-side surface of the fifth lens element are combined in an optical imaging lens element, it may be beneficial to converge rays passing through the first and second lens elements.

When the negative refracting power of the sixth lens element, the convex optical axis region of the image-side surface of the sixth lens element and the concave periphery region of the image-side surface of the sixth lens element are further combined in the optical imaging lens element, it may be beneficial to adjust the optical aberrations. When the optical imaging lens further satisfies (G12+BFL)/(G23+G34+G45+G56)≥3.000, the volume of the optical imaging lens may be effectively shrunk to maintain good optical characteristics. Preferably, the optical imaging lens may satisfy 3.000≤(G12+BFL)/(G23+G34+G45+G56)≤12.200.

When the optical imaging lenses mentioned above further satisfy that the first lens element has the negative refracting power or the third lens element has the positive refracting power or the fifth lens element has the positive refracting power, the field of view may be enlarged and the aberrations at the center of field of an image plane may be adjusted.

When the optical imaging lens is made from proper material that satisfies at least one of the inequalities listed below, imaging rays may be better conveyed and deflected, and chromatic aberration may be effectively adjusted at the same time to provide good image quality:

V2+V5+V6≤120.000; preferably, the optical imaging lens may satisfy 86.000≤V2+V5+V6≤120.000;

(V2+V3+V4)/(V1+V5)≤1.000; preferably, the optical imaging lens may satisfy 0.800≤(V2+V3+V4)/(V1+V5)≤1.000;

(V4+V5+V6)/V2≥2.800; preferably, the optical imaging lens may satisfy 2.800≤(V4+V5+V6)/V2≤6.700.

When at least one of the six lens elements is made from glass, the effective focal length of the optical imaging lens may be immuned from temperature change. Specifically, when the second lens element L2, the fifth lens element L5 or the sixth lens element L6 is made from glass, better thermal stability may be shown.

When HFOV of the optical imaging lens further satisfies the inequalities listed below, it may be beneficial to effectively enlarge field of view, shrink volume and maintain good image quality at the same time:

HFOV/(EFL+BFL)≥15.000 degrees/mm; preferably, the optical imaging lens may satisfy 15.000 degrees/mm≤HFOV/(EFL+BFL)≤45.000 degrees/mm;

HFOV/TL≥9.500 degrees/mm; preferably, the optical imaging lens may satisfy 9.500 degrees/mm≤HFOV/TL≤25.500 degrees/mm.

Considering the production difficulty of the optical imaging lens, when the optical imaging lens further satisfies at least one of the inequalities listed below, the thickness of the lens elements and/or the air gaps between the lens elements may be adjusted properly to shorten the system length of the optical imaging lens:

D11t22/T3≤3.500; preferably, the optical imaging lens may satisfy 1.700≤D11t22/T3≤3.500;

ALT/(G56+T6)≥8.400; preferably, the optical imaging lens may satisfy 8.400≤ALT/(G56+T6)≤15.000;

TL/(G23+T3)≤6.100; preferably, the optical imaging lens may satisfy 4.000≤TL/(G23+T3)≤6.100;

(EFL+T3+T4)/(T2+T5)≤1.700; preferably, the optical imaging lens may satisfy 0.900≤(EFL+T3+T4)/(T2+T5)≤1.700;

AAG/(T2+T3)≤1.000; preferably, the optical imaging lens may satisfy 0.350≤AAG/(T2+T3)≤1.000;

(T1+T4+T6)/T5≤1.800; preferably, the optical imaging lens may satisfy 0.750≤(T1+T4+T6)/T5≤1.800;

(T1+T4+T6)/T5≤1.000; preferably, the optical imaging lens may satisfy 0.750≤(T1+T4+T6)/T5≤1.000;

ALT/AAG≥3.200; preferably, the optical imaging lens may satisfy 3.200≤ALT/AAG≤5.300;

TTL/(G45+T5)≤8.000; preferably, the optical imaging lens may satisfy 3.850≤TTL/(G45+T5)≤8.000;

TTL/(G45+T5)≤6.000; preferably, the optical imaging lens may satisfy 3.850≤TTL/(G45+T5)≤6.000;

(EFL+AAG)/BFL≤2.000; preferably, the optical imaging lens may satisfy 1.100≤(EFL+AAG)/BFL≤2.000;

T2/T1≥1.000; preferably, the optical imaging lens may satisfy 1.000≤T2/T1≤3.000;

(G45+T5+G56)/(T4+T6)≥1.600; preferably, the optical imaging lens may satisfy 1.600≤(G45+T5+G56)/(T4+T6)≤3.200;

ALT/(G34+T4+G45)≥8.000; preferably, the optical imaging lens may satisfy 8.000≤ALT/(G34+T4+G45)≤13.300;

TTL/AAG≥5.400; preferably, the optical imaging lens may satisfy 5.400≤TTL/AAG≤8.200;

TL/BFL≤3.600; preferably, the optical imaging lens may satisfy 2.700≤TL/BFL≤3.600.

When the optical imaging lens further satisfies (T1+T4+T6)/T5≤1.000 or TTL/(G45+T5)≤6.000, its volume may be further shrunk for a lighter weight.

In light of the unpredictability in an optical system, satisfying these inequalities listed above may result in enlarging the field of view, shortening the system length of the optical imaging lens, promoting the imaging quality and/or increasing the yield in the assembly process in the present disclosure.

Figure 6:
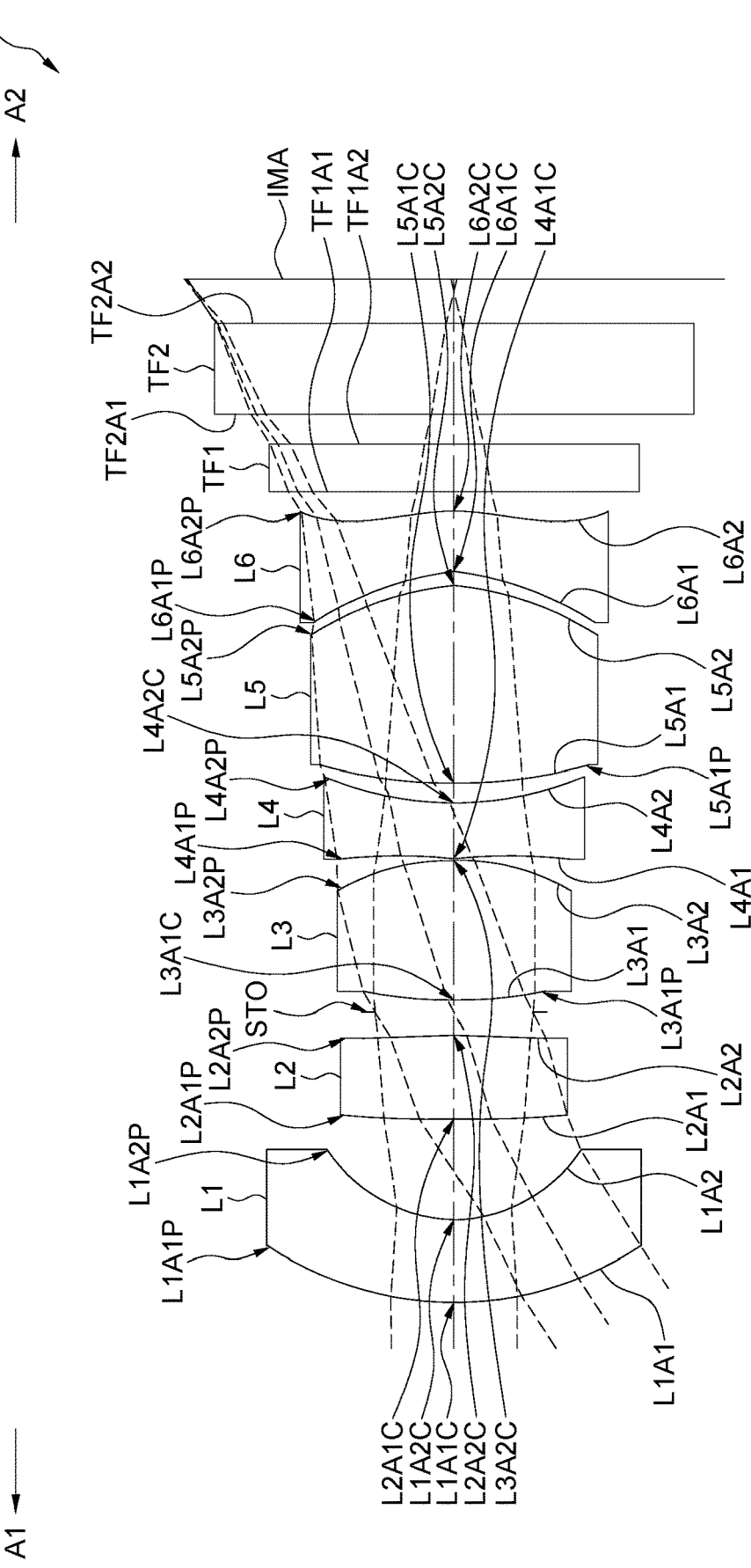
FIG. 6 depicts a cross-sectional view of a first embodiment of an optical imaging lens according to the present disclosure.

Several example embodiments and associated optical data will now be provided for illustrating example embodiments of an optical imaging lens with a wide field of view and a small volume. Reference is now made to FIGS. 6-9. FIG. 6 illustrates an example cross-sectional view of an optical imaging lens 1 of the optical imaging lens according to a first example embodiment. FIGS. 7A-7D show example charts of a longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in the order from an object side A1 to an image side A2 along an optical axis, a first lens element L1, a second lens element L2, an aperture stop STO, a third lens element L3, a fourth lens element L4, a fifth lens element L5 and a sixth lens element L6. A first filtering unit TF1, a second filtering unit TF2 and an image plane IMA of an image sensor (not shown) may be positioned at the image side A2 of the optical lens 1. Each of the first, second, third, fourth, fifth and sixth lens elements L1, L2, L3, L4, L5, L6, the first filtering unit TF1 and the second filtering unit TF2 may comprise an object-side surface L1A1/L2A1/L3A1/L4A1/L5A1/L6A1/TF1A1/TF2A1 facing toward the object side A1 and an image-side surface L1A2/L2A2/L3A2/L4A2/L5A2/L6A2/TF1A2/TF2A2 facing toward the image side A2. The first filtering unit TF1 is positioned between the sixth lens element L6 and the second filtering unit TF2, and the second filtering unit TF2 is positioned between the first filtering unit TF1 and the image plane IMA. The first filtering unit TF1 and the second filtering units TF2 may selectively absorb light with specific wavelength(s) from the light passing through optical imaging lens 1 or a piece of glass protecting the image sensor. The example embodiment of one of the first filtering unit TF1 and the second filtering units TF2 which may selectively absorb light with specific wavelength(s) from the light passing through optical imaging lens 1 may be an IR cut filter (infrared cut filter). Then, IR light may be absorbed, and this may prohibit the IR light, which might not be seen by human eyes, from producing an image on the image plane IMA.

To lighten the weight, the first, second, third, fourth, fifth and sixth lens elements L1, L2, L3, L4, L5, and L6 may be made from, but not limited to, plastic. To enhance thermal stability of the optical imaging lens, the fifth lens element L5 may be made from, but not limited to, glass.

An example embodiment of the first lens element L1 may have negative refracting power. On the object-side surface L1A1, both an optical axis region L1A1C and a periphery region L1A1P may be convex. On the image-side surface L1A2, both an optical axis region L1A2C and a periphery region L1A2P may be concave.

An example embodiment of the second lens element L2 may have positive refracting power. On the object-side surface L2A1, an optical axis region L2A1C may be concave and a periphery region L2A1P may be convex. On the image-side surface L2A2, both an optical axis region L2A2C and a periphery region L2A2P may be convex.

An example embodiment of the third lens element L3 may have positive refracting power. On the object-side surface L3A1, both an optical axis region L3A1C and a periphery region L3A1P may be convex. On the image-side surface L3A2, both an optical axis region L3A2C and a periphery region L3A2P may be convex.

An example embodiment of the fourth lens element L4 may have negative refracting power. On the object-side surface L4A1, an optical axis region L4A1C may be convex and a periphery region L4A1P may be concave. On the image-side surface L4A2, both an optical axis region L4A2C and a periphery region L4A2P may be concave.

An example embodiment of the fifth lens element L5 may have positive refracting power. On the object-side surface L5A1, both an optical axis region L5A1C and a periphery region L5A1P may be convex. On the image-side surface L5A2, both an optical axis region L5A2C and a periphery region L5A2P may be convex.

An example embodiment of the sixth lens element L6 may have negative refracting power. On the object-side surface L6A1, both an optical axis region L6A1C and a periphery region L6A1P may be concave. On the image-side surface L6A2, an optical axis region L6A2C may be convex and a periphery region L6A2P may be concave.

A total of twelve aspherical surfaces, including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5 and the object-side surface L6A1 and the image-side surface L6A2 of the sixth lens element L6 may all be defined by the following aspherical formula:

$$Z(Y) = \frac{Y^2}{R} \left/ \left(1 + \sqrt{1 - (1+K)\frac{Y^2}{R^2}}\right) + \sum_{i=1}^{n} a_i \times Y^i \right.$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; $a_i$ represents an aspherical coefficient of $i^{th}$ level.

The values of each aspherical parameter are shown in FIG. 9. Please note that in the present embodiment and other embodiments, the aspherical coefficient of $2^{nd}$ level $a_2$ is always zero.

Figures 7A, 7B, 7C, 7D:
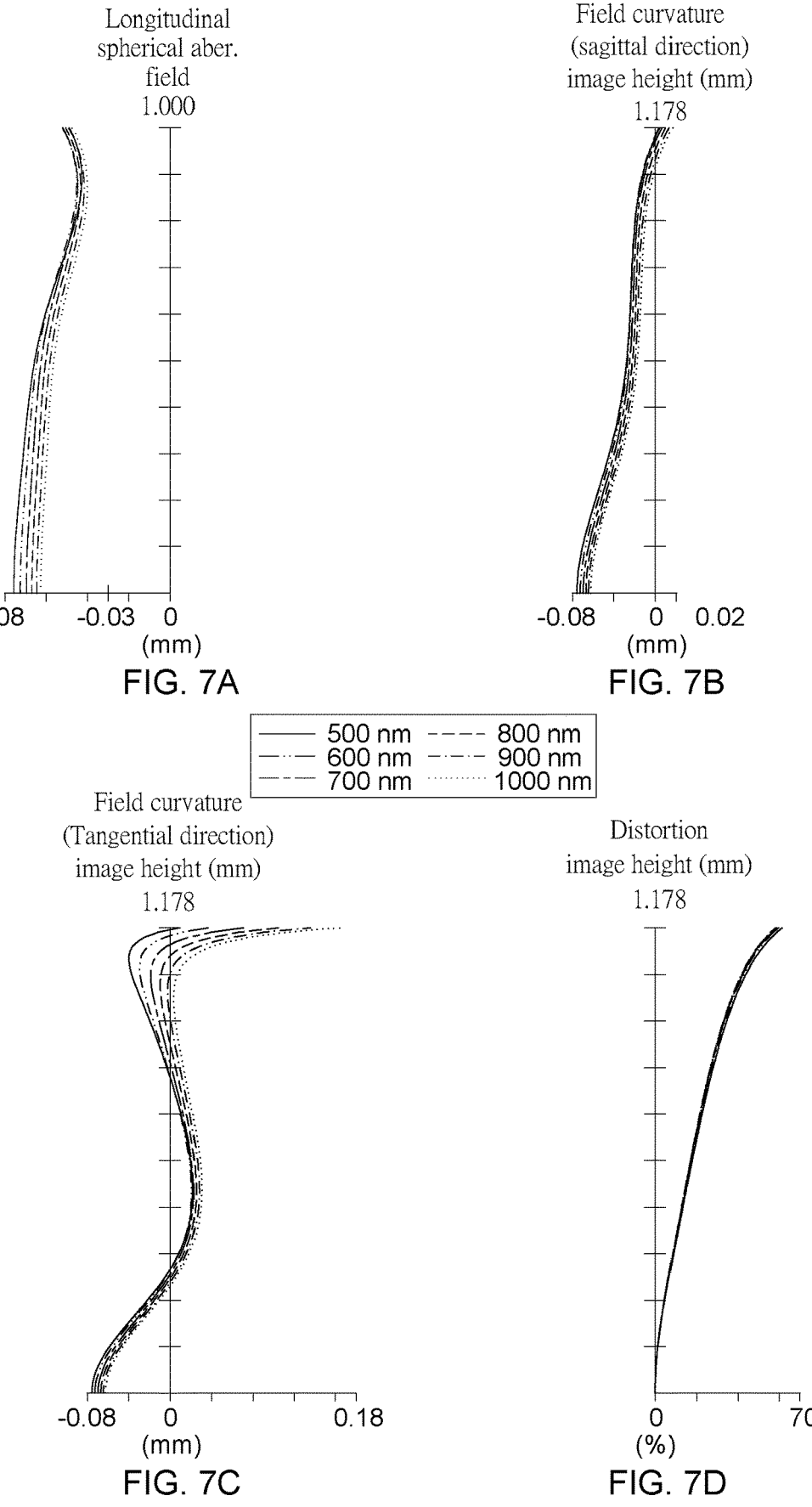
FIGS. 7A, 7B, 7C and 7D depict charts of a longitudinal spherical aberration and other kinds of optical aberrations of a first embodiment of the optical imaging lens according to the present disclosure.

Referring to FIG. 7A, a longitudinal spherical aberration of the optical imaging lens for six different wavelengths (1000 nm, 900 nm, 800 nm, 700 nm, 600 nm, 500 nm) in the present embodiment is shown in coordinates in which the horizontal axis represents focus and the vertical axis represents field of view, and FIG. 7B, curvature of field of the optical imaging lens in the present embodiment in the sagittal direction for the six different wavelengths (1000 nm, 900 nm, 800 nm, 700 nm, 600 nm, 500 nm) is shown in coordinates in which the horizontal axis represents focus and the vertical axis represents image height, and FIG. 7C, curvature of field in the tangential direction of the optical imaging lens for the six different wavelengths (1000 nm, 900 nm, 800 nm, 700 nm, 600 nm, 500 nm) in the present embodiment is shown in coordinates in which the horizontal axis represents curvature of field and the vertical axis represents image height, and FIG. 7D, distortion aberration of the optical imaging lens for the six different wavelengths (1000 nm, 900 nm, 800 nm, 700 nm, 600 nm, 500 nm) in the present embodiment is shown in coordinates in which the horizontal axis represents percentage and the vertical axis represents image height. The curves of different wavelengths (1000 nm, 900 nm, 800 nm, 700 nm, 600 nm, 500 nm) may be close to each other. This represents that off-axis light with respect to these wavelengths may be focused around an image point. From the vertical deviation of each curve shown in FIG. 7A, the offset of the off-axis light relative to the image point may be within −0.08~−0.03 mm. Therefore, the present embodiment may improve the longitudinal spherical aberration with respect to different wavelengths. For curvature of field in the sagittal direction shown in FIG. 7B, the focus variation with respect to the three wavelengths in the whole field may fall within −0.08~0.02 mm. For curvature of field in the tangential direction shown in FIG. 7C, the focus variation with respect to the three wavelengths in the whole field may fall within −0.08~0.18 mm. Referring to FIG. 7D, the variation of the distortion aberration may be within 0~70%.

As shown in FIG. 8, the HFOV of the optical imaging lens 1 of the present embodiment is 33.300 degrees, and the system length is 4.484 mm. In light of the aberrations shown in FIGS. 7A-7D, the optical imaging lens 1 may enlarge half field of view, shorten system length and provide good imaging quality at the same time.

Please refer to FIGS. 38A and 38B for the values of BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

Figure 10:
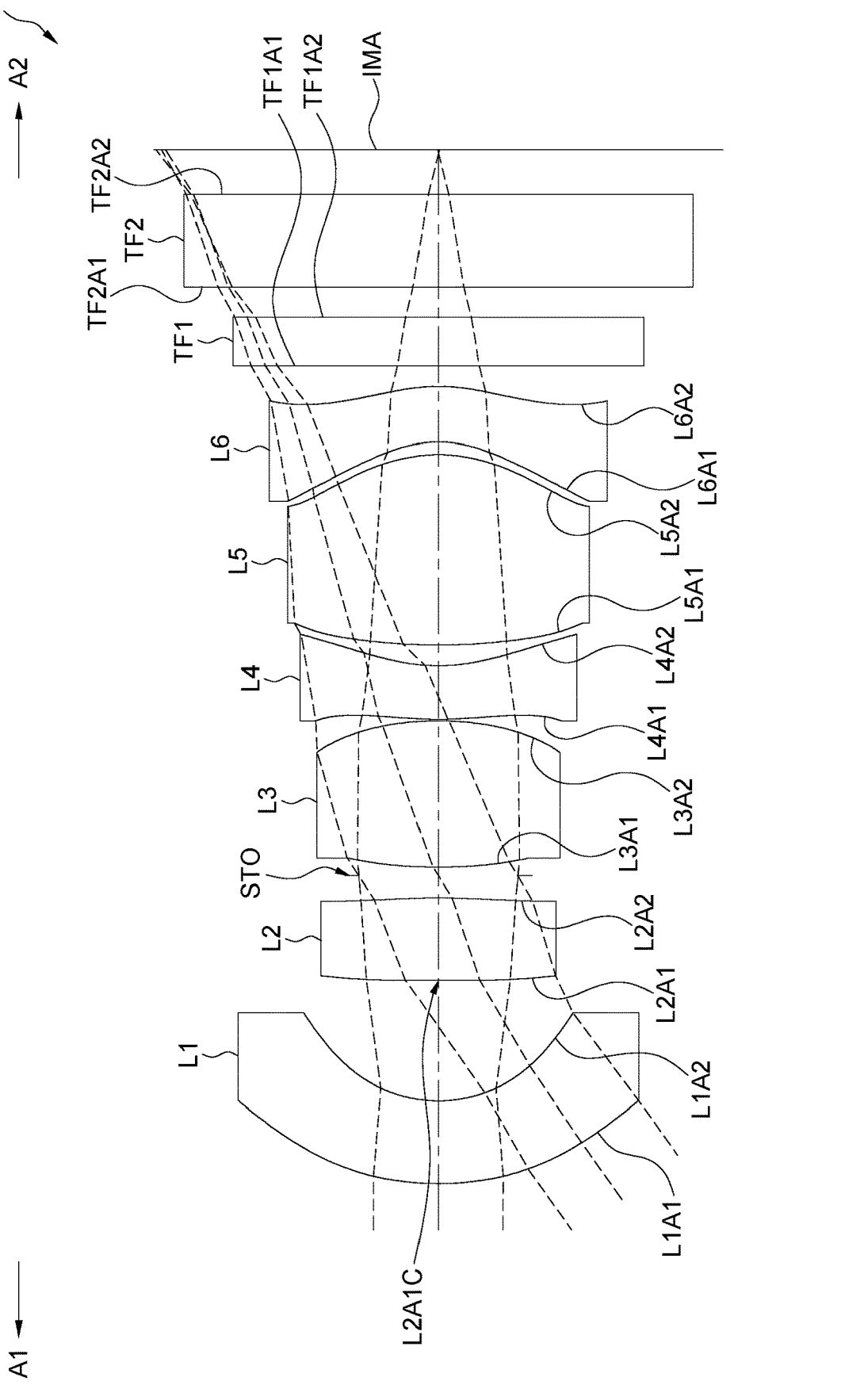
FIG. 10 depicts a cross-sectional view of a second embodiment of an optical imaging lens according to the present disclosure.

Reference is now made to FIGS. 10-13. FIG. 10 illustrates an example cross-sectional view of an optical imaging lens 2 according to a second example embodiment. FIGS. 11A, 11B, 11C and 11D show example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 along an optical axis, may comprise a first lens element L1, a second lens element L2, an aperture stop STO, a third lens element L3, a fourth lens element L4, a fifth lens element L5 and a sixth lens element L6.

The configuration of the concave/convex shape of surfaces, comprising the object-side surfaces L1A1, L3A1, L4A1, L5A1 and L6A1 and the image-side surfaces L1A2, L2A2, L3A2, L4A2, L5A2 and L6A2, and positive or negative configuration of the refracting power of each lens element, may be similar to those in the first embodiment; however, the concave/convex shape of the object-side surface L2A1 and material to make the sixth lens element L6 may be different from those in the first embodiment. Further, the radius of curvature and thickness of each lens element, aspherical data and related optical parameters, such as system effective focal length, may be different from those in the first embodiment. Specifically, an optical axis region L2A1C on the object-side surface L2A1 of the second lens element L2 may be convex, and the sixth lens element L6 may be made from glass.

Here, for clearly showing the drawings of the present embodiment, only the surface shapes which are different from that in the first embodiment may be labeled. Please refer to FIG. 12 for the optical characteristics of each lens elements in the optical imaging lens 2 of the present embodiment.

Figures 11A, 11B, 11C, 11D:
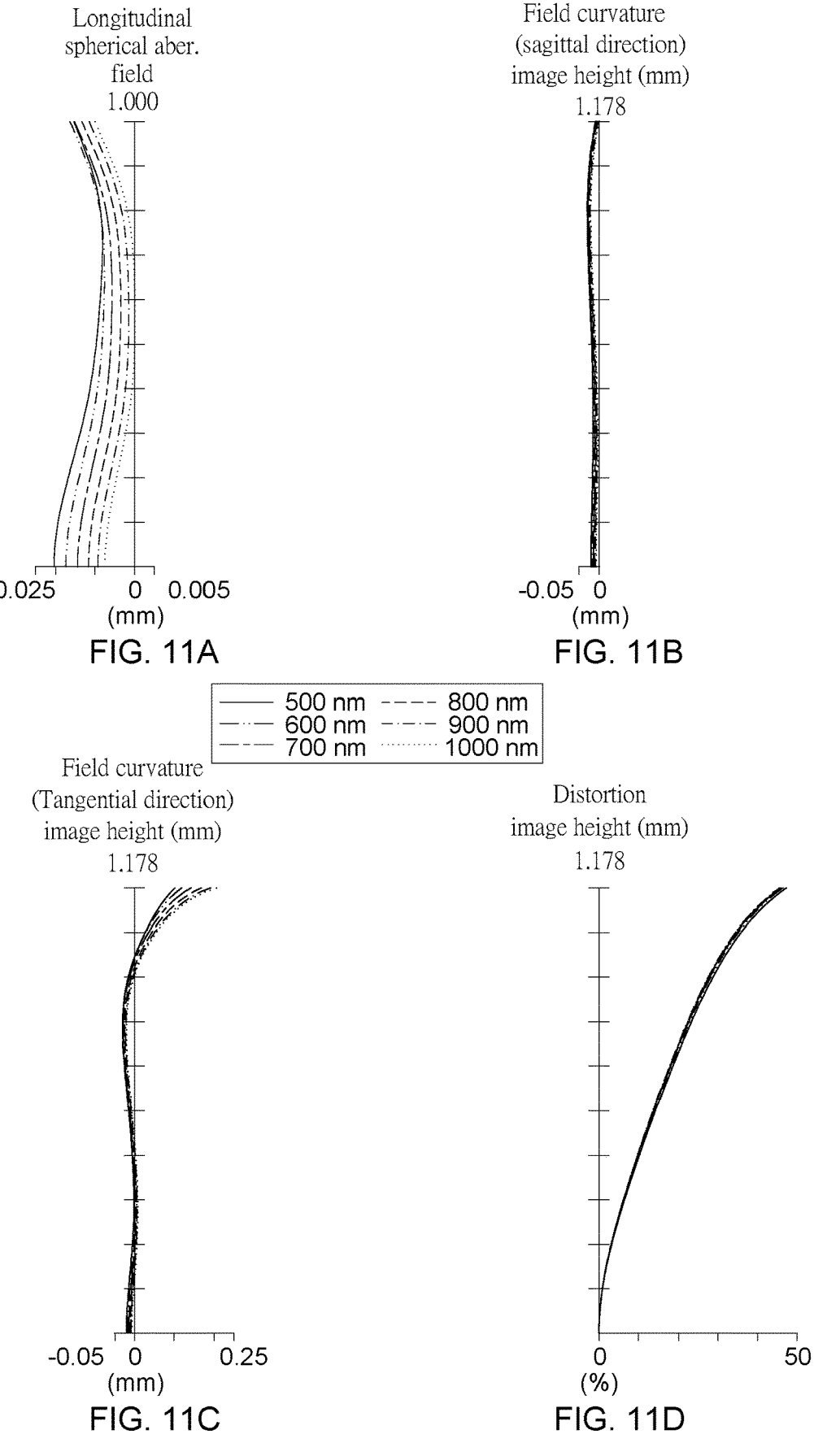
FIGS. 11A, 11B, 11C and 11D depict charts of a longitudinal spherical aberration and other kinds of optical aberrations of a second embodiment of the optical imaging lens according to the present disclosure.

As the longitudinal spherical aberration shown in FIG. 11A, the offset of the off-axis ray relative to the image point may be within −0.025~0.005 mm. As the curvature of field in the sagittal direction shown in FIG. 11B, the focus variation with regard to the three wavelengths in the whole field may fall within −0.05~0 mm. As the curvature of field in the tangential direction shown in FIG. 11C, the focus variation with regard to the three wavelengths in the whole field may fall within −0.05~0.025 mm. As shown in FIG. 11D, the variation of the distortion aberration may be within 0~50%. Compared with the first embodiment, the longitudinal spherical aberration, the curvature of field in both the sagittal and tangential directions and the distortion aberration may be less in the present embodiment.

As shown in FIG. 12, in the optical imaging lens 2, the HFOV is 35.409 degrees and the system length is 4.469 mm. Referring to the aberration shown in FIGS. 11A-11D, it may be readily understood that the optical imaging lens 2 is capable to provide with enlarged HFOV and shortened system length, as well as good imaging quality.

Please refer to FIGS. 38A and 38B for the values of each parameter and BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

Figure 14:
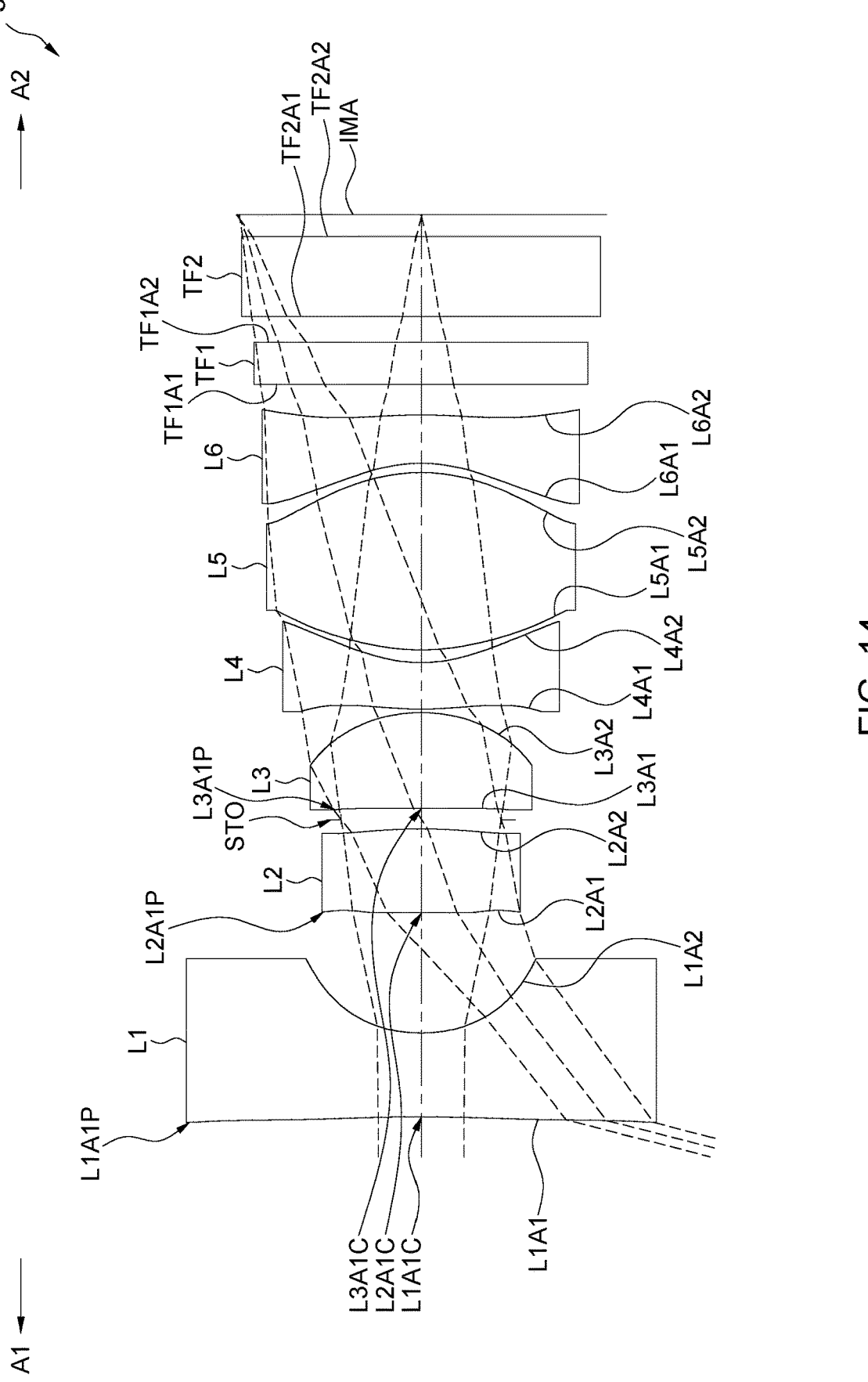
FIG. 14 depicts a cross-sectional view of a third embodiment of an optical imaging lens according to the present disclosure.

Reference is now made to FIGS. 14-17. FIG. 14 illustrates an example cross-sectional view of an optical imaging lens 3 according to a third example embodiment. FIGS. 15A, 15B, 15C and 15D show example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment.

As shown in FIG. 14, the optical imaging lens 3 of the present embodiment, in an order from an object side A1 to an image side A2 along an optical axis, may comprise a first lens element L1, a second lens element L2, an aperture stop STO, a third lens element L3, a fourth lens element L4, a fifth lens element L5 and a sixth lens element L6.

The configuration of the concave/convex shape of surfaces, comprising the object-side surfaces L4A1, L5A1 and L6A1 and the image-side surfaces L1A2, L2A2, L3A2, L4A2, L5A2 and L6A2, and positive or negative configuration of the refracting power of each lens element may be similar to those in the first embodiment; however, the concave/convex shape of the object-side surfaces L1A1, L2A1 and L3A1 may be different from those in the first embodiment. Further, the radius of curvature and thickness of each lens element, aspherical data and related optical parameters, such as system effective focal length, may be different from those in the first embodiment. Specifically, both an optical axis region L1A1C and a periphery region L1A1P on the object-side surface L1A1 of the first lens element L1 may be concave, an optical axis region L2A1C on the object-side surface L2A1 of the second lens element L2 may be convex, a periphery region L2A1P on the object-side surface L2A1 of the second lens element L2 may be concave, and both an optical axis region L3A1C and a periphery region L3A1P on the object-side surface L3A1 of the third lens element L3 may be concave.

Here, for clearly showing the drawings of the present embodiment, only the surface shapes which are different from that in the first embodiment may be labeled. Please refer to FIG. 16 for the optical characteristics of each lens elements in the optical imaging lens 3 of the present embodiment.

Figures 15A, 15B, 15C, 15D:
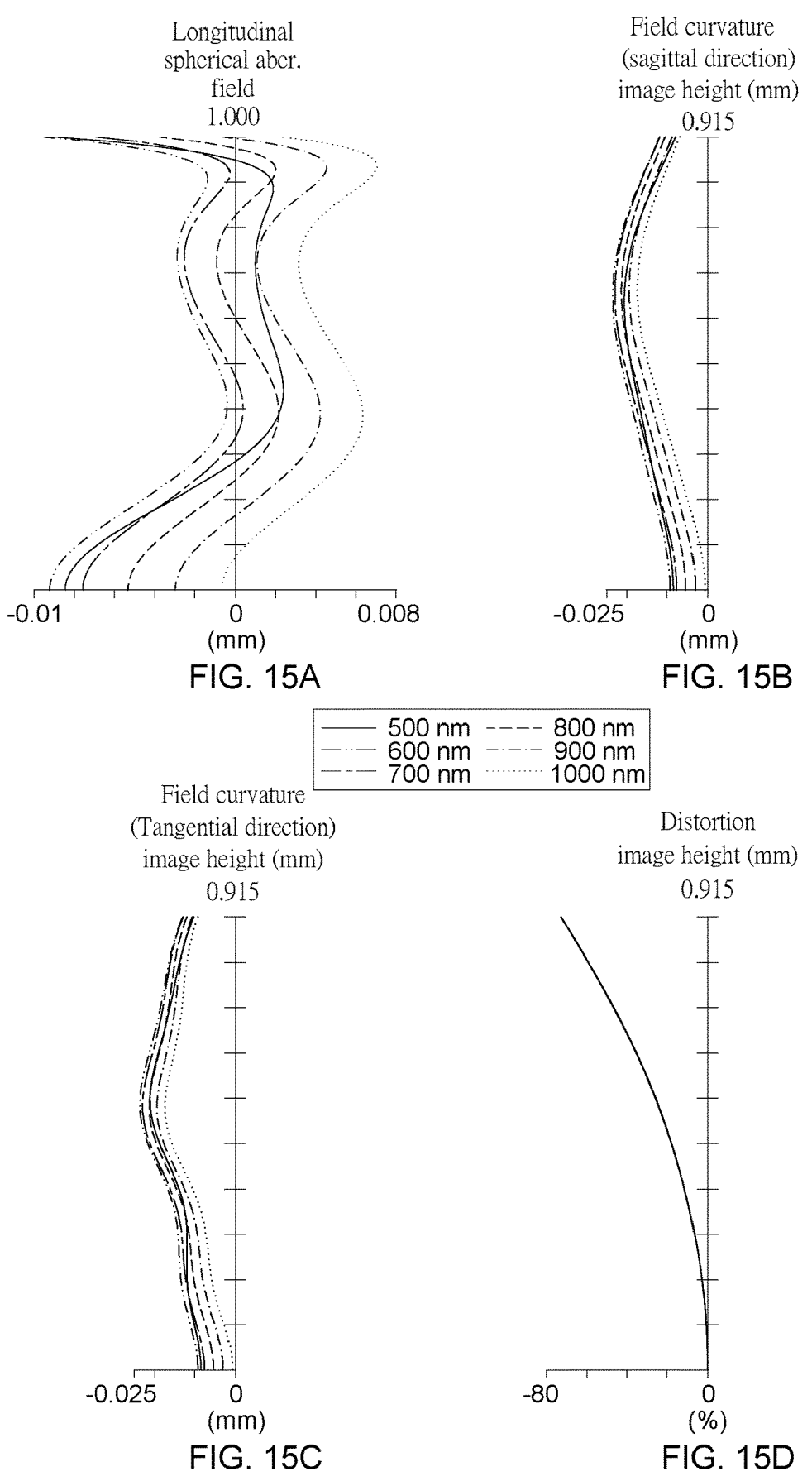
FIGS. 15A, 15B, 15C and 15D depict charts of a longitudinal spherical aberration and other kinds of optical aberrations of a third embodiment of the optical imaging lens according to the present disclosure.

As the longitudinal spherical aberration shown in FIG. 15A, the offset of the off-axis ray relative to the image point may be within −0.01~0.008 mm. As the curvature of field in the sagittal direction shown in FIG. 15B, the focus variation with regard to the three wavelengths in the whole field may fall within −0.025~0 mm. As the curvature of field in the tangential direction shown in FIG. 15C, the focus variation with regard to the three wavelengths in the whole field may fall within −0.025~0 mm. As shown in FIG. 15D, the variation of the distortion aberration may be within −80~0%. Compared with the first embodiment, the longitudinal spherical aberration and the curvature of field in both the sagittal and tangential directions may be less in the present embodiment.

As shown in FIG. 16, in the optical imaging lens 3, the HFOV is 75.552 degrees and the system length is 4.508 mm. Referring to the aberration shown in FIGS. 15A-15D, it may be readily understood that the optical imaging lens 3 is capable to provide with enlarged HFOV and good imaging quality.

Please refer to FIGS. 38A and 38B for the values of each parameter and BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

Figure 18:
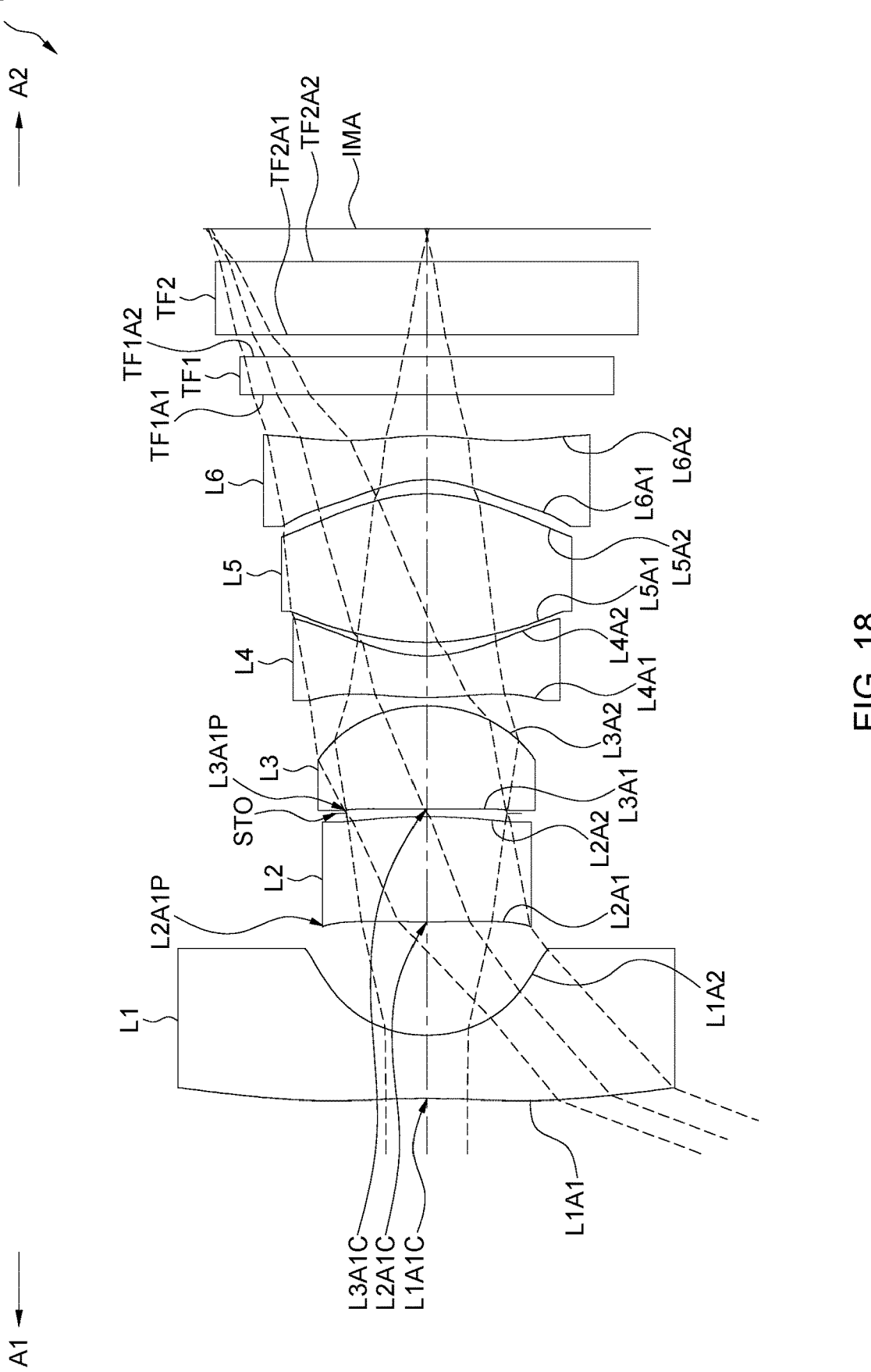
FIG. 18 depicts a cross-sectional view of a fourth embodiment of an optical imaging lens according to the present disclosure.

Reference is now made to FIGS. 18-21. FIG. 18 illustrates an example cross-sectional view of an optical imaging lens 4 according to a fourth example embodiment. FIGS. 19A, 19B, 19C and 19D show example charts of a longitudinal spherical aberration and other kinds of optical aberrations of the optical imaging lens 4 according to the fourth example embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 along an optical axis, may comprise a first lens element L1, a second lens element L2, an aperture stop STO, a third lens element L3, a fourth lens element L4, a fifth lens element L5 and a sixth lens element L6.

The configuration of the concave/convex shape of surfaces, comprising the object-side surfaces L4A1, L5A1 and L6A1 and the image-side surfaces L1A2, L2A2, L3A2, L4A2, L5A2 and L6A2, and positive or negative configuration of the refracting power of each lens element may be similar to those in the first embodiment; however, the concave/convex shape of the object-side surfaces L1A1, L2A1, L3A1 may be different from those in the first embodiment. Further, the radius of curvature and thickness of each lens element, aspherical data and related optical parameters, such as system effective focal length, may be different from those in the first embodiment. Specifically, an optical axis region L1A1C on the object-side surface L1A1 of the first lens element L1 may be concave, an optical axis region L2A1C on the object-side surface L2A1 of the second lens element L2 may be convex, a periphery region L2A1P on the object-side surface L2A1 of the second lens element L2 may be concave, and both an optical axis region L3A1C and a periphery region L3A1P on the object-side surface L3A1 of the third lens element L3 may be concave.

Here, for clearly showing the drawings of the present embodiment, only the surface shapes which are different from that in the first embodiment may be labeled. Please refer to FIG. 20 for the optical characteristics of each lens elements in the optical imaging lens 4 of the present embodiment.

Figures 19A, 19B, 19C, 19D:
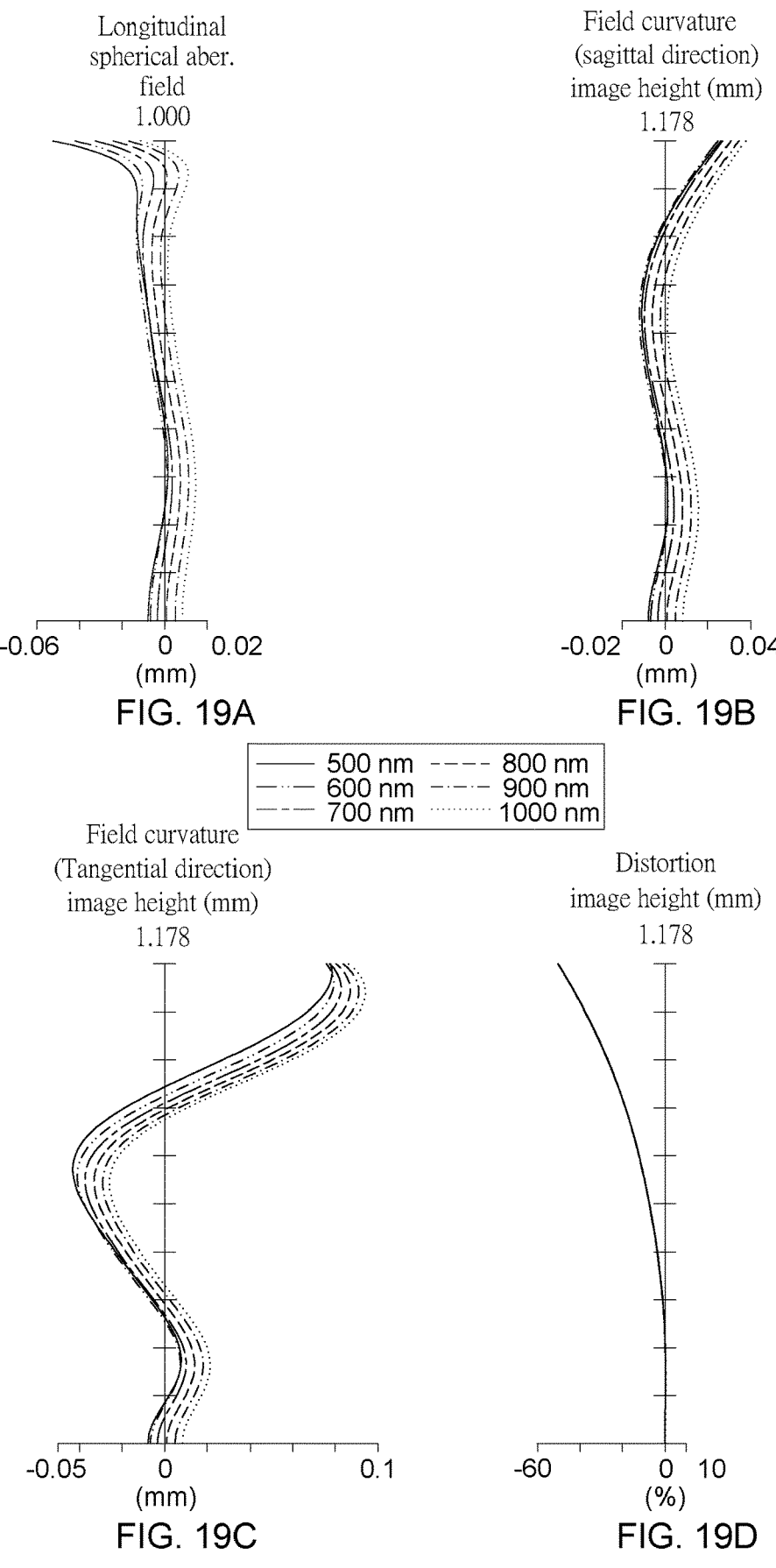
FIGS. 19A, 19B, 19C and 19D depict charts of a longitudinal spherical aberration and other kinds of optical aberrations of a fourth embodiment of the optical imaging lens according to the present disclosure.

As the longitudinal spherical aberration shown in FIG. 19A, the offset of the off-axis ray relative to the image point may be within −0.06~0.02 mm. As the curvature of field in the sagittal direction shown in FIG. 19B, the focus variation with regard to the three wavelengths in the whole field may fall within −0.02~0.04 mm. As the curvature of field in the tangential direction shown in FIG. 19C, the focus variation with regard to the three wavelengths in the whole field may fall within −0.05~0.1 mm. As shown in FIG. 19D, the variation of the distortion aberration may be within −60~10%. Compared with the first embodiment, the curvature of field in both the sagittal and tangential directions may be less in the present embodiment.

As shown in FIG. 20, in the optical imaging lens 4, the HFOV is 69.313 degrees and the system length is 4.752 mm. Referring to the aberration shown in FIGS. 19A-19D, it may be readily understood that the optical imaging lens 4 is capable to provide with enlarged HFOV and good imaging quality.

Please refer to FIGS. 38A and 38B for the values of each parameter and BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

Figure 22:
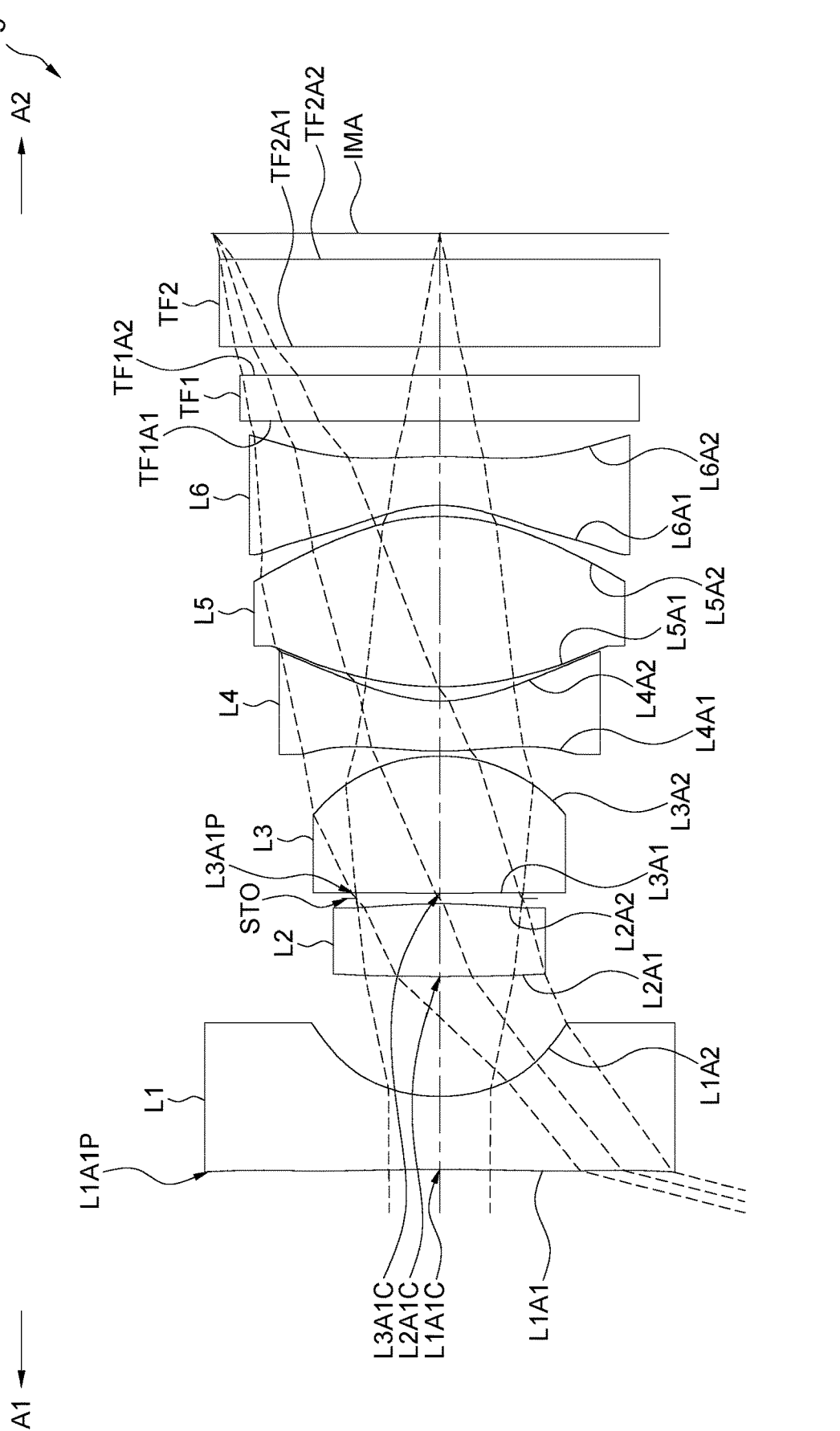
FIG. 22 depicts a cross-sectional view of a fifth embodiment of an optical imaging lens according to the present disclosure.

Reference is now made to FIGS. 22-25. FIG. 22 illustrates an example cross-sectional view of an optical imaging lens 5 according to a fifth example embodiment. FIGS. 23A, 23B, 23C and 23D show example charts of a longitudinal spherical aberration and other kinds of optical aberrations of the optical imaging lens 5 according to the fifth example embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22, the optical imaging lens 5 of the present embodiment may comprise, in an order from an object side A1 to an image side A2 along an optical axis, a first lens element L1, a second lens element L2, an aperture stop STO, a third lens element L3, a fourth lens element L4, a fifth lens element L5 and a sixth lens element L6.

The configuration of the concave/convex shape of surfaces, comprising the object-side surfaces L4A1, L5A1 and L6A1 and the image-side surfaces L1A2, L2A2, L3A2, L4A2, L5A2 and L6A2, and positive or negative configuration of the refracting power of each lens element may be similar to those in the first embodiment; however, the concave/convex shape of the object-side surfaces L1A1, L2A1, L3A1 may be different from those in the first embodiment. Further, the radius of curvature and thickness of each lens element, aspherical data and related optical parameters, such as system effective focal length, may be different from those in the first embodiment. Specifically, both an optical axis region L1A1C and a periphery region L1A1P on the object-side surface L1A1 of the first lens element L1 may be concave, an optical axis region L2A1C on the object-side surface L2A1 of the second lens element L2 may be convex, and both an optical axis region L3A1C and a periphery region L3A1P on the object-side surface L3A1 of the third lens element L3 may be concave.

Here, for clearly showing the drawings of the present embodiment, only the surface shapes which are different from that in the first embodiment may be labeled. Please refer to FIG. 24 for the optical characteristics of each lens elements in the optical imaging lens 5 of the present embodiment.

Figures 23A, 23B, 23C, 23D:
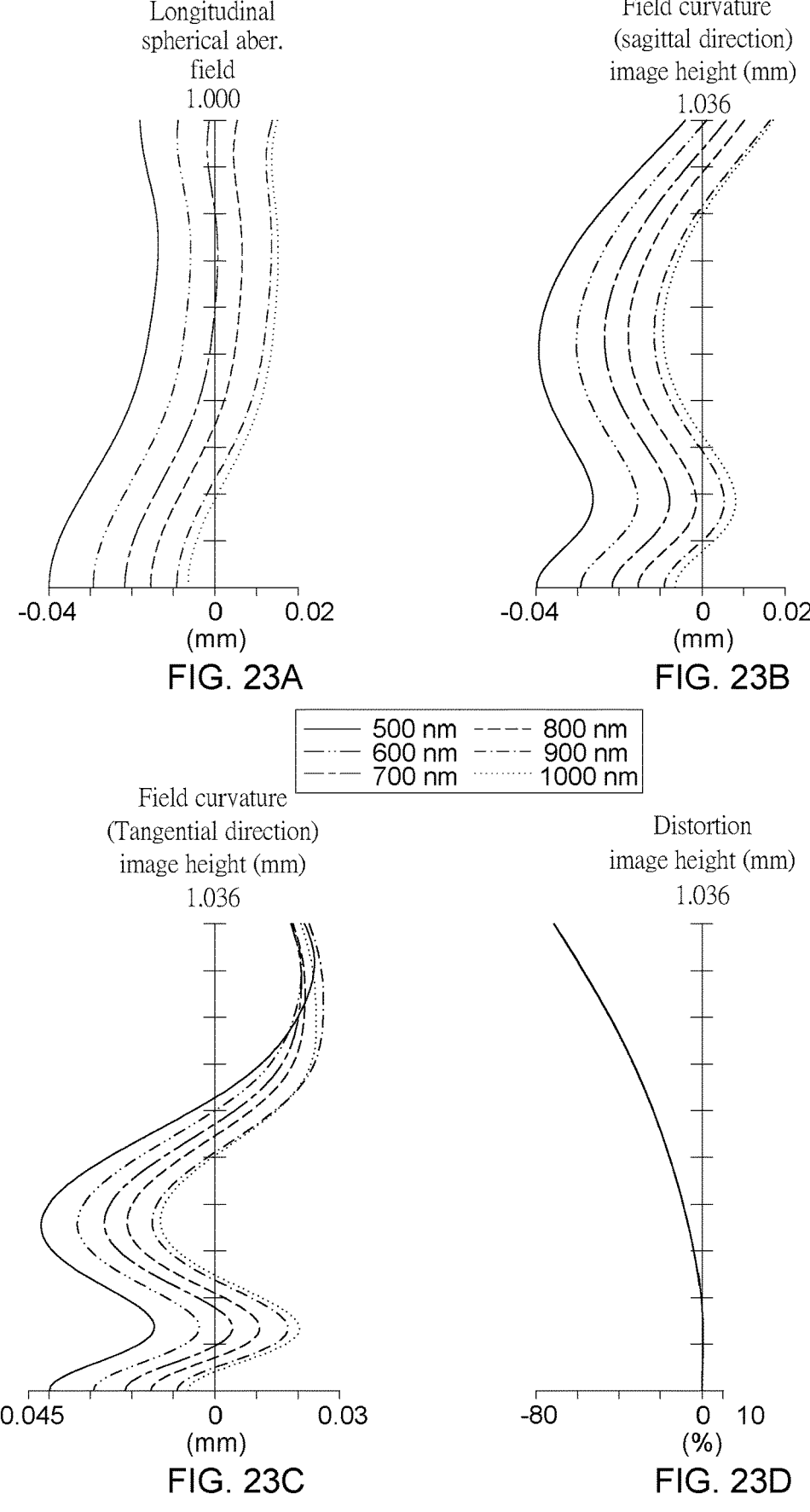
FIGS. 23A, 23B, 23C and 23D depict charts of a longitudinal spherical aberration and other kinds of optical aberrations of a fifth embodiment of the optical imaging lens according to the present disclosure.

As the longitudinal spherical aberration shown in FIG. 23A, the offset of the off-axis ray relative to the image point may be within −0.04~0.02 mm. As the curvature of field in the sagittal direction shown in FIG. 23B, the focus variation with regard to the three wavelengths in the whole field may fall within −0.04~0.02 mm. As the curvature of field in the tangential direction shown in FIG. 23C, the focus variation with regard to the three wavelengths in the whole field may fall within −0.045~0.03 mm. As shown in FIG. 23D, the variation of the distortion aberration may be within −80~10%. Compared with the first embodiment, the curvature of field in both the sagittal and tangential directions may be less in the present embodiment.

As shown in FIG. 24, in the optical imaging lens 5, the HFOV is 75.552 degrees and the system length is 4.286 mm. Referring to the aberration shown in FIGS. 23A-23D, it may be readily understood that the optical imaging lens 5 is capable to provide with enlarged aperture HFOV, shortened system length and good imaging quality.

Please refer to FIGS. 38C and 38D for the values of each parameter and BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

Figure 26:
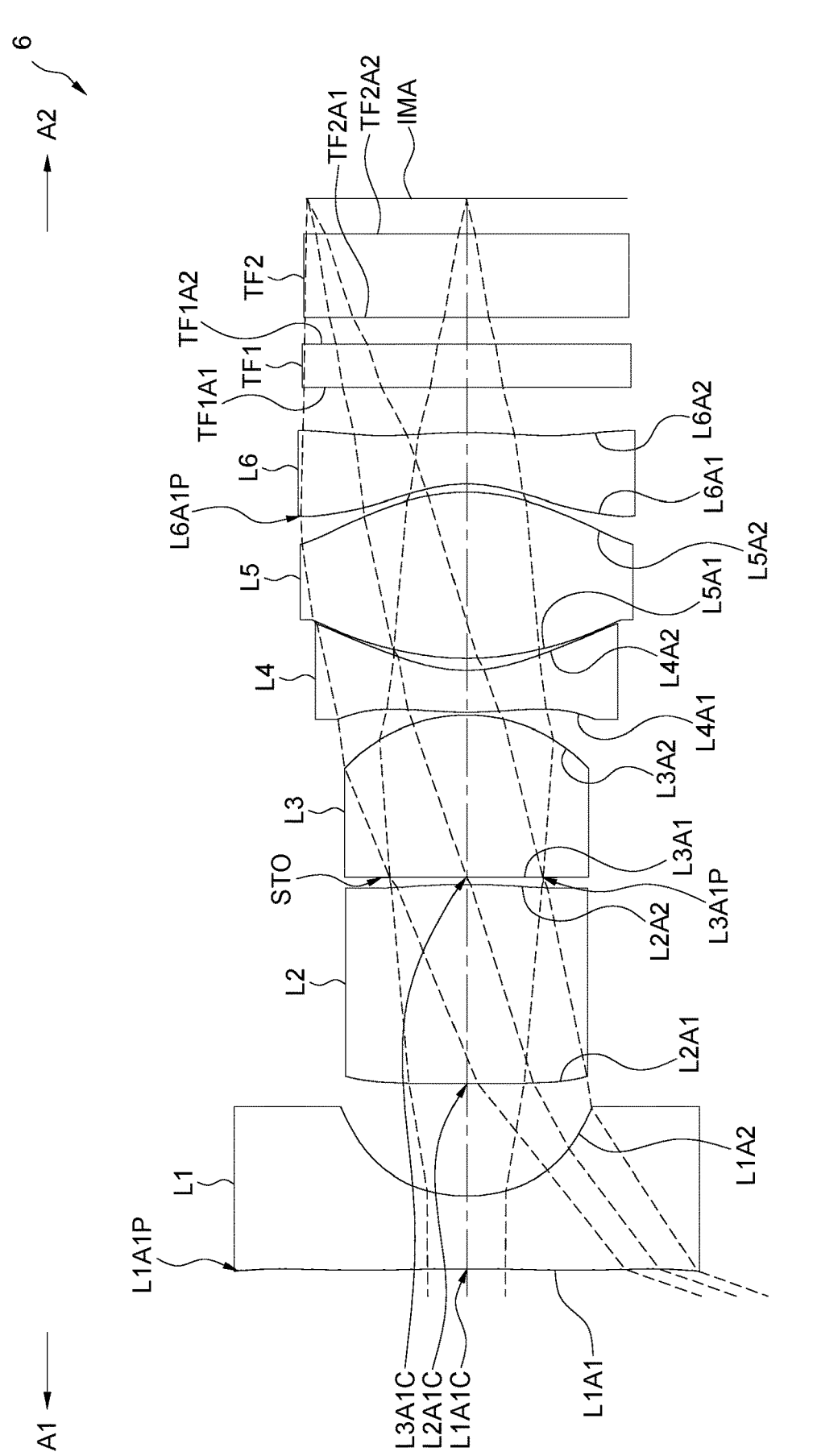
FIG. 26 depicts a cross-sectional view of a sixth embodiment of an optical imaging lens according to the present disclosure.

Reference is now made to FIGS. 26-29. FIG. 26 illustrates an example cross-sectional view of an optical imaging lens 6 according to a sixth example embodiment. FIGS. 27A, 27B, 27C and 27D show example charts of a longitudinal spherical aberration and other kinds of optical aberrations of the optical imaging lens 6 according to the sixth example embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26, the optical imaging lens 6 of the present embodiment, in an order from an object side A1 to an image side A2 along an optical axis, may comprise a first lens element L1, a second lens element L2, an aperture stop STO, a third lens element L3, a fourth lens element L4, a fifth lens element L5 and a sixth lens element L6.

The configuration of the concave/convex shape of surfaces, comprising the object-side surfaces L4A1 and L5A1 and the image-side surfaces L1A2, L2A2, L3A2, L4A2, L5A2 and L6A2, and positive or negative configuration of the refracting power of each lens element may be similar to those in the first embodiment; however, the concave/convex shape of the object-side surfaces L1A1, L2A1, L3A1 and L6A1 may be different from those in the first embodiment. Further, the radius of curvature and thickness of each lens element, aspherical data and related optical parameters, such as system effective focal length, may be different from those in the first embodiment. Specifically, both an optical axis region L1A1C and a periphery region L1A1P on the object-side surface L1A1 of the first lens element L1 may be concave, an optical axis region L2A1C on the object-side surface L2A1 of the second lens element L2 may be convex, both an optical axis region L3A1C and a periphery region L3A1P on the object-side surface L3A1 of the third lens element L3 may be concave, and a periphery region L6A1P on the object-side surface L6A1 of the sixth lens element L6 may be convex.

Here, for clearly showing the drawings of the present embodiment, only the surface shapes which are different from that in the first embodiment may be labeled. Please refer to FIG. 28 for the optical characteristics of each lens elements in the optical imaging lens 6 of the present embodiment.

Figures 27A, 27B, 27C, 27D:
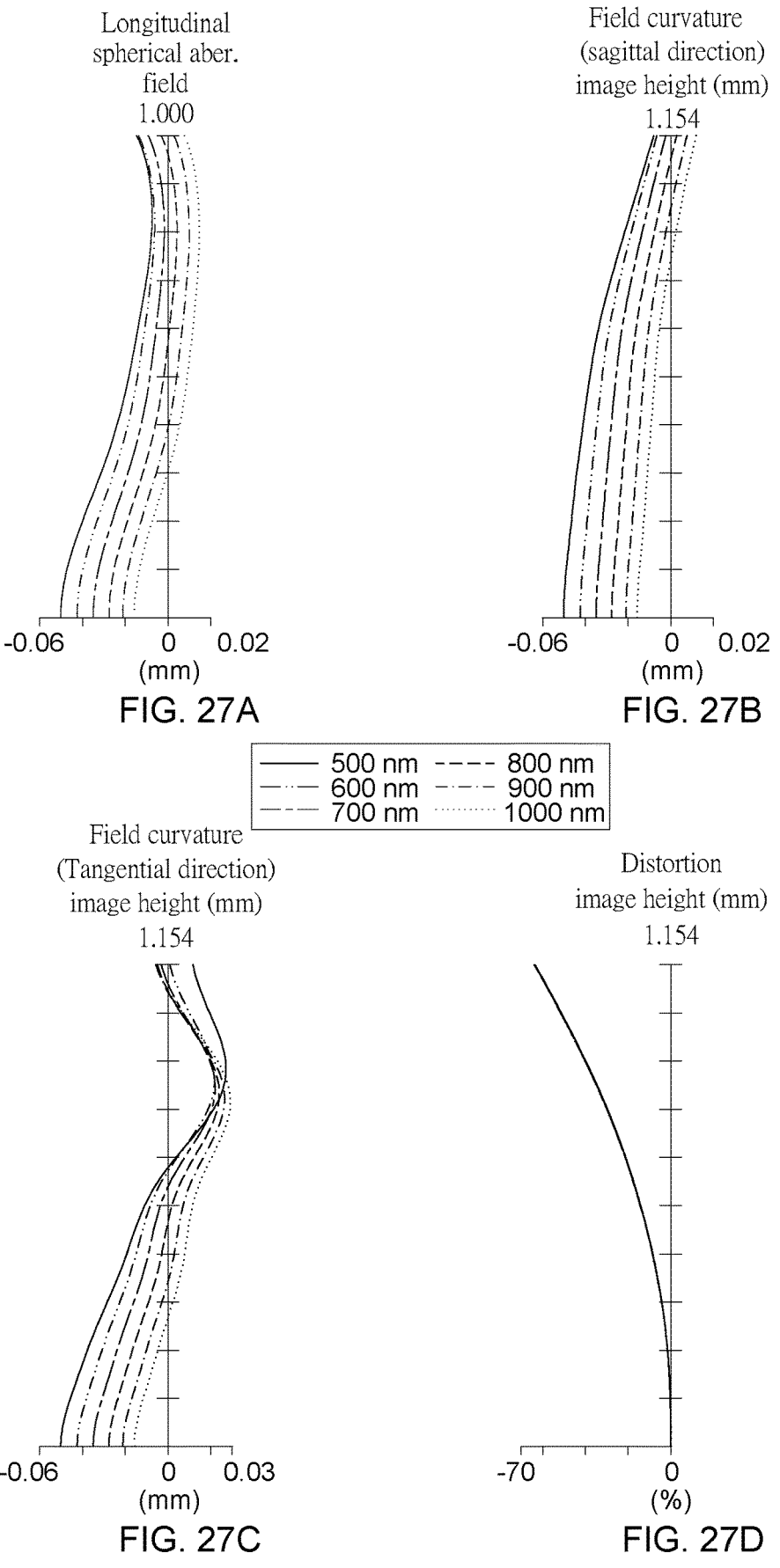
FIGS. 27A, 27B, 27C and 27D depict charts of a longitudinal spherical aberration and other kinds of optical aberrations of a sixth embodiment of the optical imaging lens according the present disclosure.

As the longitudinal spherical aberration shown in FIG. 27A, the offset of the off-axis ray relative to the image point may be within −0.06~0.02 mm. As the curvature of field in the sagittal direction shown in FIG. 27B, the focus variation with regard to the three wavelengths in the whole field may fall within −0.06~0.02 mm. As the curvature of field in the tangential direction shown in FIG. 27C, the focus variation with regard to the three wavelengths in the whole field may fall within −0.06~0.03 mm. As shown in FIG. 27D, the variation of the distortion aberration may be within −70~0%. Compared with the first embodiment, the curvature of field in both the sagittal and tangential directions may be less in the present embodiment.

As shown in FIG. 28, in the optical imaging lens 6, the HFOV is 70.278 degrees and the system length is 7.754 mm. Referring to the aberration shown in FIGS. 27A-27D, it may be readily understood that the optical imaging lens 6 is capable to provide with enlarged HFOV and good imaging quality.

Please refer to FIGS. 38C and 38D for the values of each parameter and BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

Figure 30:
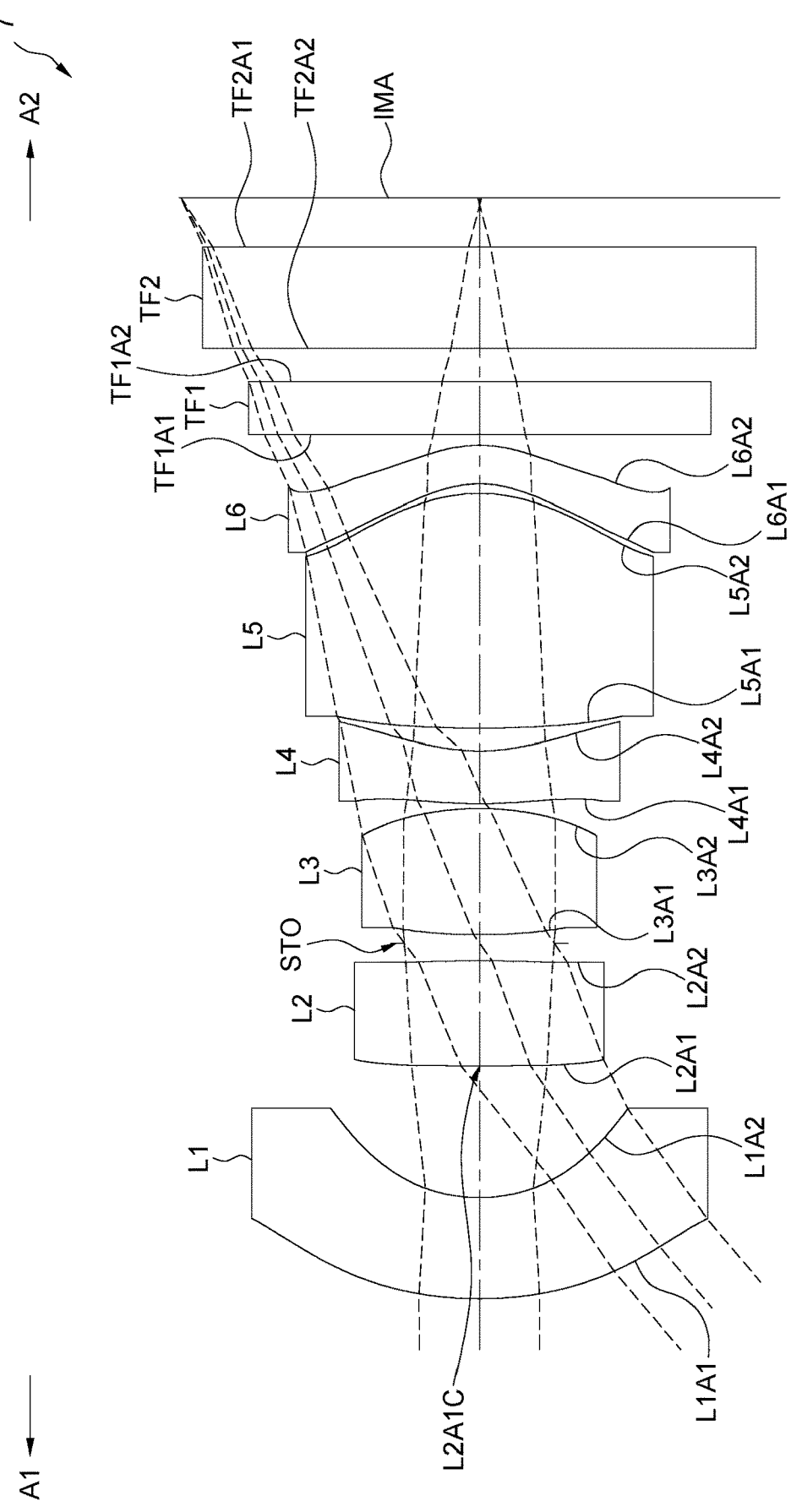
FIG. 30 depicts a cross-sectional view of a seventh embodiment of an optical imaging lens according to the present disclosure.

Reference is now made to FIGS. 30-33. FIG. 30 illustrates an example cross-sectional view of an optical imaging lens 7 according to a seventh example embodiment. FIGS. 31A, 31B, 31C and 31D show example charts of a longitudinal spherical aberration and other kinds of optical aberrations of the optical imaging lens 7 according to the seventh example embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30, the optical imaging lens 7 of the present embodiment, in an order from an object side A1 to an image side A2 along an optical axis, may comprise a first lens element L1, a second lens element L2, an aperture stop STO, a third lens element L3, a fourth lens element L4, a fifth lens element L5 and a sixth lens element L6.

The configuration of the concave/convex shape of surfaces, comprising the object-side surfaces L1A1, L3A1, L4A1, L5A1 and L6A1 and the image-side surfaces L1A2, L2A1, L3A2, L4A2, L5A2 and L6A2, and positive or negative configuration of the refracting power of each lens element may be similar to those in the first embodiment; however, the concave/convex shape of the object-side surface L2A1 and the material to make the second lens element L2 may be different from those in the first embodiment. Further, the radius of curvature and thickness of each lens element, aspherical data and related optical parameters, such as system effective focal length, may be different from those in the first embodiment. Specifically, an optical axis region L2A1C on the object-side surface L2A1 of the second lens element L2 may be convex, and the second lens element L2 may be made from glass.

Here, for clearly showing the drawings of the present embodiment, only the surface shapes which are different from that in the first embodiment may be labeled. Please refer to FIG. 32 for the optical characteristics of each lens elements in the optical imaging lens 7 of the present embodiment.

Figures 31A, 31B, 31C, 31D:
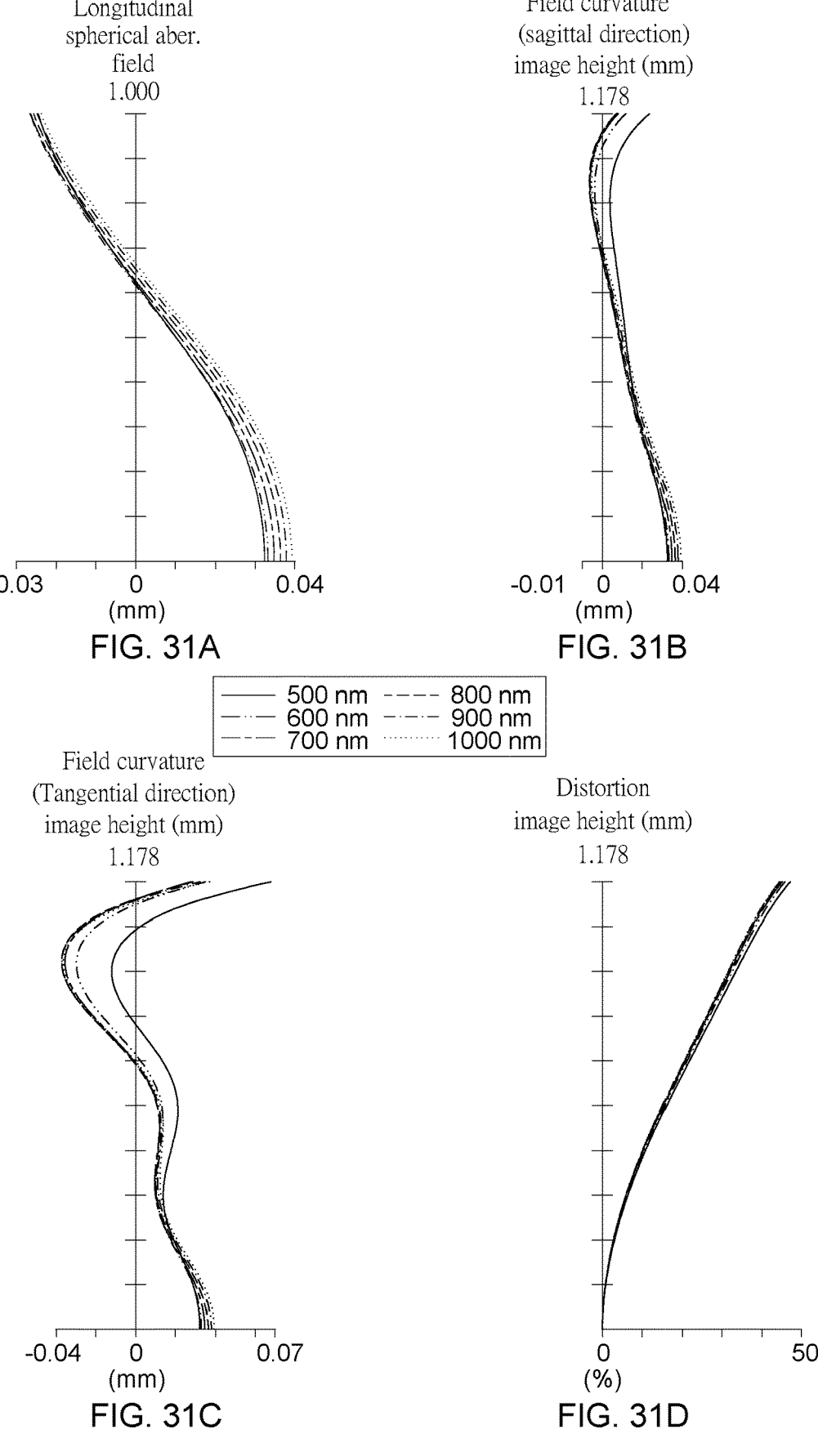
FIGS. 31A, 31B, 31C and 31D depict charts of a longitudinal spherical aberration and other kinds of optical aberrations of a seventh embodiment of the optical imaging lens according to the present disclosure.

As the longitudinal spherical aberration shown in FIG. 31A, the offset of the off-axis ray relative to the image point may be within −0.03~0.04 mm. As the curvature of field in the sagittal direction shown in FIG. 31B, the focus variation with regard to the three wavelengths in the whole field may fall within −0.01~0.04 mm. As the curvature of field in the tangential direction shown in FIG. 31C, the focus variation with regard to the three wavelengths in the whole field may fall within −0.04~0.07 mm. As shown in FIG. 31D, the variation of the distortion aberration may be within 0~50%. Compared with the first embodiment, the curvature of field in both the sagittal and tangential directions may be less in the present embodiment.

As shown in FIG. 32, in the optical imaging lens 7, the HFOV is 40.196 degrees and the system length is 4.346 mm. Referring to the aberration shown in FIGS. 31A-31D, it may be readily understood that the optical imaging lens 7 is capable to provide with enlarged HFOV and shortened system length, as well as good imaging quality.

Please refer to FIGS. 38C and 38D for the values of each parameter and BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

Figure 34:
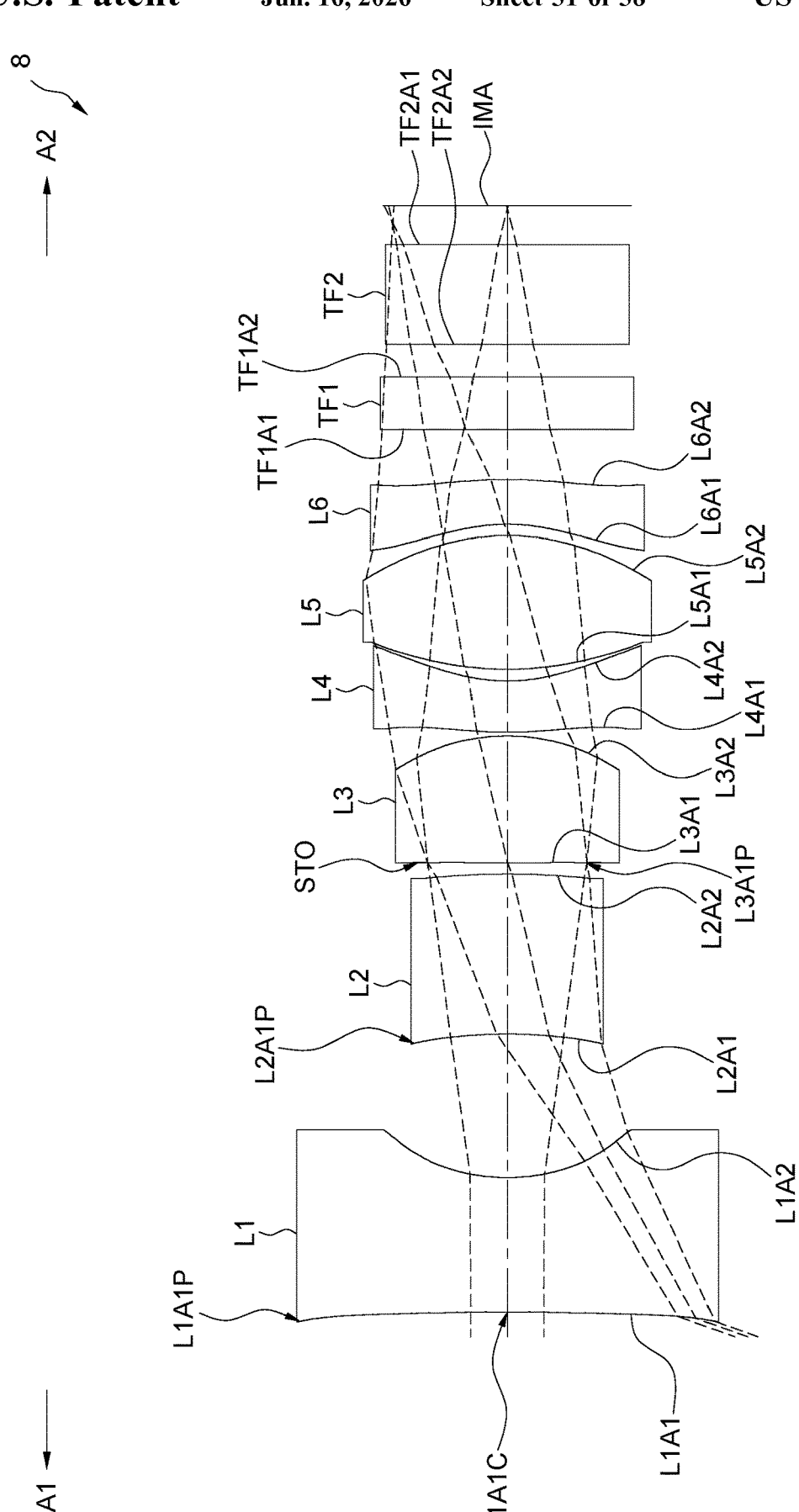
FIG. 34 depicts a cross-sectional view of an eighth embodiment of an optical imaging lens according to the present disclosure.

Reference is now made to FIGS. 34-37. FIG. 34 illustrates an example cross-sectional view of an optical imaging lens 8 according to an eighth example embodiment. FIGS. 35A, 35B, 35C and 35D show example charts of a longitudinal spherical aberration and other kinds of optical aberrations of the optical imaging lens 8 according to the eighth example embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34, the optical imaging lens 8 of the present embodiment, in an order from an object side A1 to an image side A2 along an optical axis, may comprise a first lens element L1, a second lens element L2, an aperture stop STO, a third lens element L3, a fourth lens element L4, a fifth lens element L5 and a sixth lens element L6.

The configuration of the concave/convex shape of surfaces, comprising the object-side surfaces L4A1, L5A1 and L6A1 and the image-side surfaces L1A2, L2A2, L3A2, L4A2, L5A2 and L6A2, and positive or negative configuration of the refracting power of each lens element, except for the second lens element L2, may be similar to those in the first embodiment; however, the concave/convex shape of the object-side surfaces L1A1, L2A1, L3A1 and negative refracting power of the second lens element L2 may be different from those in the first embodiment. Further, the radius of curvature and thickness of each lens element, aspherical data and related optical parameters, such as system effective focal length, may be different from those in the first embodiment. Specifically, both an optical axis region L1A1C and a periphery region L1A1P on the object-side surface L1A1 of the first lens element L1 may be concave, a periphery region L2A1P on the object-side surface L2A1 of the second lens element L2 may be concave, and a periphery region L3A1P on the object-side surface L3A1 of the third lens element L3 may be concave.

Here, for clearly showing the drawings of the present embodiment, only the surface shapes which are different from that in the first embodiment may be labeled. Please refer to FIG. 36 for the optical characteristics of each lens elements in the optical imaging lens 8 of the present embodiment.

Figures 35A, 35B, 35C, 35D:
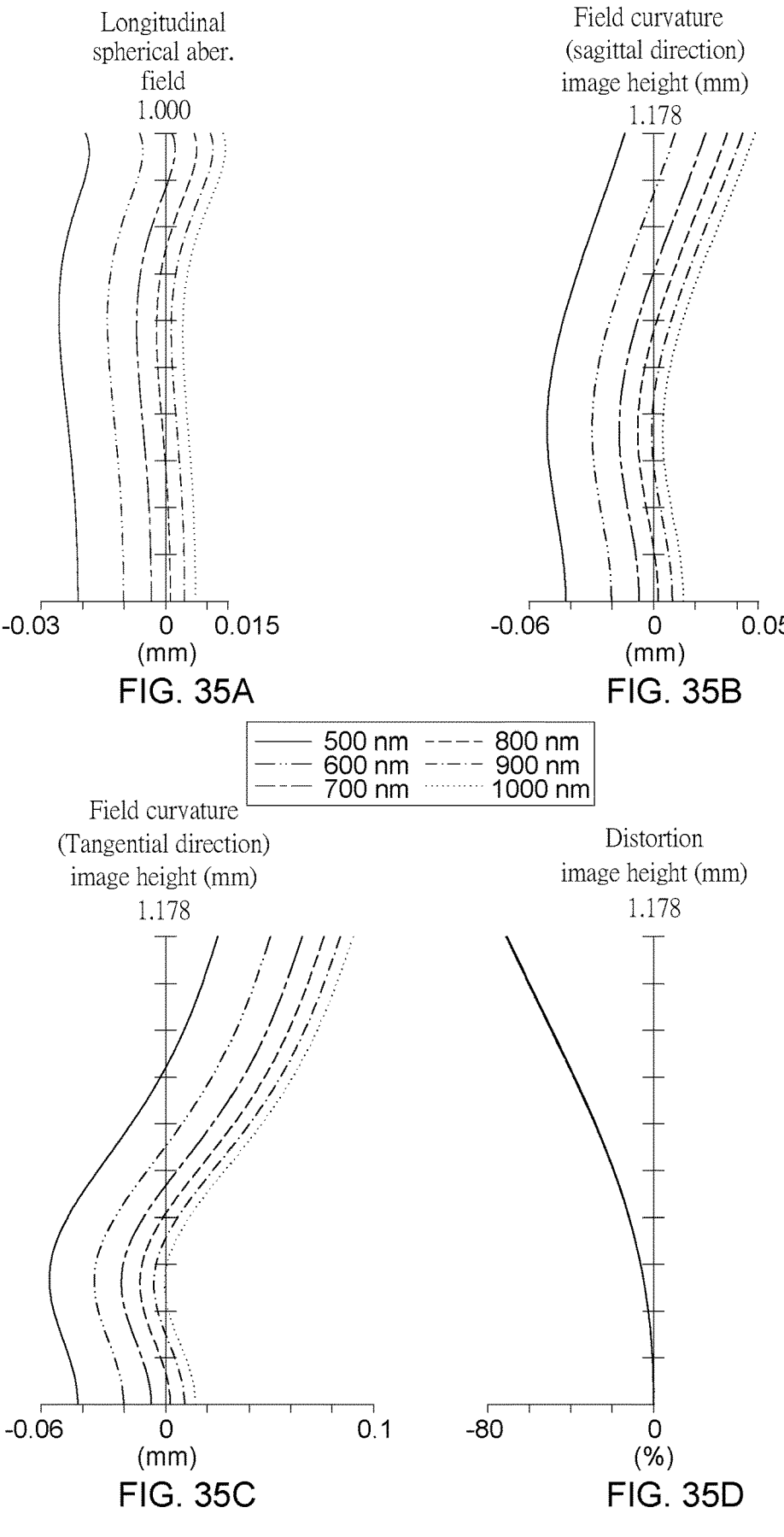
FIGS. 35A, 35B, 35C and 35D depict charts of a longitudinal spherical aberration and other kinds of optical aberrations of an eighth embodiment of the optical imaging lens according to the present disclosure.

As the longitudinal spherical aberration shown in FIG. 35A, the offset of the off-axis ray relative to the image point may be within −0.03~0.015 mm. As the curvature of field in the sagittal direction shown in FIG. 35B, the focus variation with regard to the three wavelengths in the whole field may fall within −0.06~0.05 mm. As the curvature of field in the tangential direction shown in FIG. 35C, the focus variation with regard to the three wavelengths in the whole field may fall within −0.06~0.1 mm. As shown in FIG. 35D, the variation of the distortion aberration may be within −80~0%. Compared with the first embodiment, the longitudinal spherical aberration and the curvature of field in the tangential direction may be less in the present embodiment.

As shown in FIG. 36, in the optical imaging lens 8, the HFOV is 70.211 degrees and the system length is 4.440 mm. Referring to the aberration shown in FIGS. 35A-35D, it may be readily understood that the optical imaging lens 8 is capable to provide with enlarged HFOV and shortened system length, as well as good imaging quality.

Please refer to FIGS. 38C and 38D for the values of each parameter and BFL/(G23+G34+G45+G56), (G12+BFL)/(G23+G34+G45+G56), D11t22/T3, V2+V5+V6, ALT/(G56+T6), TL/(G23+T3), (EFL+T3+T4)/(T2+T5), AAG/(T2+T3), (T1+T4+T6)/T5, (V2+V3+V4)/(V1+V5), ALT/AAG, TTL/(G45+T5), (EFL+AAG)/BFL, T2/T1, (G45+T5+G56)/(T4+T6), (V4+V5+V6)/V2, ALT/(G34+T4+G45), TTL/AAG, TL/BFL, HFOV/(EFL+BFL) and HFOV/TL of the present embodiment.

According to above illustration, the longitudinal spherical aberration, field curvature in both the sagittal direction and tangential direction and distortion aberration in all embodiments may meet the user requirement of a related product in the market. The off-axis ray with regard to three different wavelengths may be focused around an image point and the offset of the off-axis ray relative to the image point may be well controlled with suppression for the longitudinal spherical aberration, field curvature both in the sagittal direction and tangential direction and distortion aberration. The curves of different wavelengths may be close to each other, and this represents that the focusing for ray having different wavelengths may be good to suppress chromatic dispersion.

In summary, lens elements are designed and matched for achieving good imaging quality.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first lens element, a second lens element, a third lens element, a fourth lens element, a fifth lens element and a sixth lens element sequentially from an object side to an image side along an optical axis, each of the first, second, third, fourth, fifth and sixth lens elements having an object-side surface facing toward the object side and allowing imaging rays to pass through and an image-side surface facing toward the image side and allowing the imaging rays to pass through, wherein:

the first lens element has negative refracting power;

an optical axis region of the image-side surface of the second lens element is convex;

the third lens element has positive refracting power;

the fourth lens element has negative refracting power, and a periphery region of the object-side surface of the fourth lens element is concave;

the fifth lens element has positive refracting power;

the sixth lens element has negative refracting power, and an optical axis region of the object-side surface of the sixth lens element is concave;

lens elements of the optical imaging lens are only the six lens elements described above; and a distance from the image-side surface of the sixth lens element to an image plane along the optical axis is represented by BFL, a distance from the image-side surface of the second lens element to the object-side surface of the third lens element along the optical axis is represented by G23, a distance from the image-side surface of the third lens element to the object-side surface of the fourth lens element along the optical axis is represented by G34, a distance from the image-side surface of the fourth lens element to the object-side surface of the fifth lens element along the optical axis is represented by G45, a distance from the image-side surface of the fifth lens element to the object-side surface of the sixth lens element along the optical axis is represented by G56, a sum of the thicknesses of all six lens elements along the optical axis is represented by ALT, a thickness of the sixth lens element along the optical axis is represented by T6, and the optical imaging lens satisfies the inequalities:

$$BFL/(G23+G34+G45+G56) \geq 3.600 \text{ and } ALT/(G56+T6) \geq 8.400.$$

2. The optical imaging lens according to claim 1, wherein a distance from the object-side surface of the first lens element to the image-side surface of the second lens element along the optical axis is represented by D11t22, a thickness of the third lens element along the optical axis is represented by T3, and D11t22 and T3 satisfy the inequality:

$$D11t22/T3 \leq 3.500.$$

3. The optical imaging lens according to claim 1, wherein an Abbe number of the second lens element is represented by V2, an Abbe number of the fifth lens element is represented by V5, an Abbe number of the sixth lens element is represented by V6, and V2, V5 and V6 satisfy the inequality:

$$V2+V5+V6 \leq 120.000.$$

4. The optical imaging lens according to claim 1, wherein a distance from the object-side surface of the first lens element to the image-side surface of the sixth lens element along the optical axis is represented by TL, a thickness of the third lens element along the optical axis is represented by T3, and TL, G23 and T3 satisfy the inequality:

$$TL/(G23+T3) \leq 6.100.$$

5. The optical imaging lens according to claim 1, wherein an effective focal length of the optical imaging lens is represented by EFL, a thickness of the third lens element along the optical axis is represented by T3, a thickness of the fourth lens element along the optical axis is represented by T4, a thickness of the second lens element along the optical axis is represented by T2, a thickness of the fifth lens element along the optical axis is represented by T5, and EFL, T3, T4, T2 and T5 satisfy the inequality:

$$(EFL+T3+T4)/(T2+T5) \leq 1.700.$$

6. The optical imaging lens according to claim 1, wherein a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis and a distance from the image-side surface of the fifth lens element to the object-side surface of the sixth lens element along the optical axis is represented by AAG, a thickness of the second lens element along the optical axis is represented by T2, a thickness of the third lens element along the optical axis is represented by T3, and AAG, T2 and T3 satisfy the inequality:

$$AAG/(T2+T3) \leq 1.000.$$

7. An optical imaging lens, comprising a first lens element, a second lens element, a third lens element, a fourth lens element, a fifth lens element and a sixth lens element sequentially from an object side to an image side along an optical axis, each of the first, second, third, fourth, fifth and sixth lens elements having an object-side surface facing toward the object side and allowing imaging rays to pass through and an image-side surface facing toward the image side and allowing the imaging rays to pass through, wherein:

the first lens element has negative refracting power;

an optical axis region of the image-side surface of the second lens element is convex;

the third lens element has positive refracting power;

the fourth lens element has negative refracting power;

the fifth lens element has positive refracting power, and an optical axis region of the image-side surface of the fifth lens element is convex;

the sixth lens element has negative refracting power, an optical axis region of the object-side surface of the sixth lens element is concave, and a periphery region of the image-side surface of the sixth lens element is concave;

lens elements of the optical imaging lens are only the six lens elements described above; and a distance from the image-side surface of the sixth lens element to an image plane along the optical axis is represented by BFL, a distance from the image-side surface of the second lens element to the object-side surface of the third lens element along the optical axis is represented by G23, a distance from the image-side surface of the third lens element to the object-side surface of the fourth lens element along the optical axis is represented by G34, a distance from the image-side surface of the fourth lens element to the object-side surface of the fifth lens element along the optical axis is represented by G45, a distance from the image-side surface of the fifth lens element to the object-side surface of the sixth lens element along the optical axis is represented by G56, a sum of the thicknesses of all six lens elements along the optical axis is represented by ALT, a thickness of the sixth lens element along the optical axis is represented by T6, and the optical imaging lens satisfies the inequalities:

$$BFL/(G23+G34+G45+G56) \geq 3.300 \text{ and } ALT/(G56+T6) \geq 8.400.$$

8. The optical imaging lens according to claim 7, wherein a thickness of the first lens element along the optical axis is represented by T1, a thickness of the fourth lens element along the optical axis is represented by T4, a thickness of the sixth lens element along the optical axis is represented by T6, a thickness of the fifth lens element along the optical axis is represented by T5, and T1, T4, T6 and T5 satisfy the inequality:

$$(T1+T4+T6)/T5 \leq 1.000.$$

9. The optical imaging lens according to claim 7, wherein an Abbe number of the second lens element is represented by V2, an Abbe number of the third lens element is represented by V3, an Abbe number of the fourth lens element is represented by V4, an Abbe number of the first lens element is represented by V1, an Abbe number of the fifth lens element is represented by V5, and V2, V3, V4, V1 and V5 satisfy the inequality:

$$(V2+V3+V4)/(V1+V5) \leq 1.000.$$

10. The optical imaging lens according to claim 7, wherein a sum of the thicknesses of all six lens elements along the optical axis is represented by ALT, a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis and a distance from the image-side surface of the fifth lens element to the object-side surface of the sixth lens element along the optical axis is represented by AAG, and ALT and AAG satisfy the inequality:

$$ALT/AAG \geq 3.200.$$

11. The optical imaging lens according to claim 7, wherein a distance from the object-side surface of the first lens element to the image plane along the optical axis is represented by TTL, a thickness of the fifth lens element along the optical axis is represented by T5, and TTL, G45 and T5 satisfy the inequality:

$$TTL/(G45+T5) \leq 6.000.$$

12. The optical imaging lens according to claim 7, wherein an effective focal length of the optical imaging lens is represented by EFL, a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis and a distance from the image-side surface of the fifth lens element to the object-side surface of the sixth lens element along the optical axis is represented by AAG, and EFL, AAG and BFL satisfy the inequality:

$(EFL+AAG)/BFL \leq 2.000$.

13. The optical imaging lens according to claim 7, wherein a thickness of the second lens element along the optical axis is represented by T2, a thickness of the first lens element along the optical axis is represented by T1, and T2 and T1 satisfy the inequality:

$T2/T1 \geq 1.000$.

14. An optical imaging lens, comprising a first lens element, a second lens element, a third lens element, a fourth lens element, a fifth lens element and a sixth lens element sequentially from an object side to an image side along an optical axis, each of the first, second, third, fourth, fifth and sixth lens elements having an object-side surface facing toward the object side and allowing imaging rays to pass through and an image-side surface facing toward the image side and allowing the imaging rays to pass through, wherein:

the first lens element has negative refracting power;
the third lens element has positive refracting power;
the fourth lens element has negative refracting power;
the fifth lens element has positive refracting power, and a periphery region of the image-side surface of the fifth lens element is convex;
the sixth lens element has negative refracting power;
an optical axis region of the image-side surface of the sixth lens element is convex, and a periphery region of the image-side surface of the sixth lens element is concave;
lens elements of the optical imaging lens are only the six lens elements described above; and
a distance from the image-side surface of the first lens element to the object-side surface of the second lens element along the optical axis is represented by G12, a distance from the image-side surface of the sixth lens element to the image plane along the optical axis is represented by BFL, a distance from the image-side surface of the second lens element to the object-side surface of the third lens element along the optical axis is represented by G23, a distance from the image-side surface of the third lens element to the object-side surface of the fourth lens element along the optical axis is represented by G34, a distance from the image-side surface of the fourth lens element to the object-side surface of the fifth lens element along the optical axis is represented by G45, a distance from the image-side surface of the fifth lens element to the object-side surface of the sixth lens element along the optical axis is represented by G56, a sum of the thicknesses of all six lens elements along the optical axis is represented by ALT, a thickness of the sixth lens element along the optical axis is represented by T6, and the optical imaging lens satisfies the inequalities:

$(G12+BFL)/(G23+G34+G45+G56) \geq 3.000$ and $ALT/(G56+T6) \geq 8.400$.

15. The optical imaging lens according to claim 14, wherein a thickness of the fifth lens element along the optical axis is represented by T5, a thickness of the fourth lens element along the optical axis is represented by T4, a thickness of the sixth lens element along the optical axis is represented by T6, and G45, T5, G56, T4 and T6 satisfy the inequality:

$(G45+T5+G56)/(T4+T6) \geq 1.600$.

16. The optical imaging lens according to claim 14, wherein an Abbe number of the fourth lens element is represented by V4, an Abbe number of the fifth lens element is represented by V5, an Abbe number of the sixth lens element is represented by V6, an Abbe number of the second lens element is represented by V2, and V4, V5, V6 and V2 satisfy the inequality:

$(V4+V5+V6)/V2 \geq 2.800$.

17. The optical imaging lens according to claim 14, wherein a sum of the thicknesses of all six lens elements along the optical axis is represented by ALT, a thickness of the fourth lens element along the optical axis is represented by T4, and ALT, G34, T4 and G45 satisfy the inequality:

$ALT/(G34+T4+G45) \geq 8.000$.

18. The optical imaging lens according to claim 14, wherein a distance from the object-side surface of the first lens element to the image plane along the optical axis is represented by TTL, a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis and a distance from the image-side surface of the fifth lens element to the object-side surface of the sixth lens element along the optical axis is represented by AAG, TTL and AAG satisfy the inequality:

$TTL/AAG \geq 5.400$.

19. The optical imaging lens according to claim 14, wherein a distance from the object-side surface of the first lens element to the image-side surface of the sixth lens element along the optical axis is represented by TL, and TL and BFL satisfy the inequality:

$TL/BFL \leq 3.600$.

* * * * *